United States Patent [19]

DeWoolfson et al.

[11] Patent Number: 5,465,822
[45] Date of Patent: Nov. 14, 1995

[54] COMMODITY DENSIFICATION ASSEMBLY HAVING A MULTIPLE PATH DISTRIBUTION DEVICE

[75] Inventors: Bruce H. DeWoolfson; Ken R. Powell, both of Fairfax, Va.; Warner Schumacher, Kansas City, Kans.

[73] Assignee: Environmental Products Corporation, Fairfax, Va.

[21] Appl. No.: 199,395

[22] Filed: Feb. 22, 1994

Related U.S. Application Data

[63] Continuation-in-part of Ser. No. 132,233, Oct. 6, 1993, Pat. No. 5,355,987, which is a continuation of Ser. No. 851,494, Mar. 16, 1992, abandoned.

[51] Int. Cl.[6] ........................................................ G07F 7/06
[52] U.S. Cl. .............................. 194/209; 209/930; 406/3; 406/123
[58] Field of Search ........................ 194/208, 209; 222/485; 209/930; 406/1, 3, 122, 123, 181, 182, 183

[56] References Cited

U.S. PATENT DOCUMENTS

| | | |
|---|---|---|
| 2,558,255 | 6/1951 | Johnson et al. . |
| 3,792,765 | 2/1974 | Arp . |
| 3,827,578 | 8/1974 | Hough ..................................... 406/182 |
| 4,009,838 | 3/1977 | Tashman . |
| 4,018,392 | 4/1977 | Wagner . |
| 4,179,018 | 12/1979 | Miller ..................................... 209/631 |
| 4,205,799 | 6/1980 | Brewer . |
| 4,285,426 | 8/1981 | Cahill ..................................... 241/99 |
| 4,324,325 | 4/1982 | DeWoolfson . |
| 4,345,679 | 8/1982 | DeWoolfson . |
| 4,373,435 | 2/1983 | Grevich ..................................... 100/49 |
| 4,402,391 | 9/1983 | Tuten et al. . |
| 4,440,284 | 4/1984 | DeWoolfson . |
| 4,454,028 | 6/1984 | Vetter et al. . |
| 4,463,844 | 8/1984 | Huffman et al. . |
| 4,469,212 | 9/1984 | DeWoolfson et al. . |
| 4,480,737 | 11/1984 | Jamgochian et al. ..................... 194/213 |
| 4,492,295 | 1/1985 | DeWoolfson . |
| 4,519,550 | 5/1985 | Rouse . |
| 4,532,859 | 8/1985 | Solordal ..................................... 100/35 |
| 4,537,361 | 8/1985 | Heimerich . |
| 4,545,540 | 10/1985 | Nakamura . |
| 4,553,617 | 11/1985 | Tatematsu ............................. 222/485 X |
| 4,573,641 | 3/1986 | DeWoolfson et al. ............... 194/205 X |
| 4,576,289 | 3/1986 | Jarrett et al. ............................. 209/631 |
| 4,579,216 | 4/1986 | DeWoolfson et al. ................... 194/212 |
| 4,597,487 | 7/1986 | Crosby et al. ........................... 194/209 |
| 4,653,627 | 3/1987 | Hampson et al. ....................... 194/209 |
| 4,655,404 | 4/1987 | Deklerow . |

(List continued on next page.)

FOREIGN PATENT DOCUMENTS

| | | |
|---|---|---|
| 0488952A2 | 6/1992 | European Pat. Off. . |
| 3723038A1 | 1/1989 | Germany . |
| 3844263C1 | 2/1990 | Germany . |
| 61-460 | 1/1986 | Japan . |

OTHER PUBLICATIONS

English Abstract of Japanese Pub. No. 61–460, 1986 Derwent Publications, Ltd., No. 86–045947/07.
English Abstract of German Pub. No. DE 3723038A1, 1986 Derwent Publications Ltd., No. 89–024982/04.
English Abstract of German Pub. No. DE 3844263C1, 1986 Derwent Publications Ltd., No. 90–045901/07.

*Primary Examiner*—F. J. Bartuska
*Attorney, Agent, or Firm*—Finnegan, Henderson, Farabow, Garrett & Dunner

[57] ABSTRACT

An assembly is provided for densifying and distributing recycled commodities, such as aluminum cans, glass bottles, and PET bottles. A sensor senses a feature of the commodity, including material of composition and color. Based on the sensed material of composition, the commodity is either shredded (aluminum and PET) or crushed (glass) into densified material. A distribution device receives the densified material and, according to its sensed material of composition and color, distributes it to the proper storage path for storage in one of a plurality of segregated storage bins.

40 Claims, 23 Drawing Sheets

U.S. PATENT DOCUMENTS

| | | | |
|---|---|---|---|
| 4,669,673 | 6/1987 | Lodovico et al. | 241/99 |
| 4,687,144 | 8/1987 | Irwin et al. | 241/49 |
| 4,688,730 | 8/1987 | Dahle . | |
| 4,691,871 | 9/1987 | Mochizuki . | |
| 4,693,428 | 9/1987 | Raterman et al. . | |
| 4,703,899 | 11/1987 | Lodovico . | |
| 4,717,026 | 1/1988 | Fischer et al. | 209/583 X |
| 4,729,515 | 3/1988 | Wagner . | |
| 4,750,678 | 6/1988 | Lodovico et al. . | |
| 4,784,251 | 11/1988 | DeWoolfson et al. | 194/209 |
| 4,787,495 | 11/1988 | Tuten et al. | 194/209 |
| 4,871,118 | 10/1989 | Maloney | 356/73 |
| 4,889,290 | 12/1989 | Koffsky et al. . | |
| 4,919,534 | 4/1990 | Reed . | |
| 4,923,126 | 5/1990 | Lodovico et al. | 241/30 |
| 4,944,462 | 7/1990 | Raterman et al. . | |
| 4,969,605 | 11/1990 | Morin . | |
| 4,981,270 | 1/1991 | Reber . | |
| 5,028,870 | 7/1991 | Reed . | |
| 5,044,570 | 9/1991 | Montgomery, Sr. . | |
| 5,060,875 | 10/1991 | McBride . | |
| 5,068,835 | 11/1991 | Reed | 367/135 |
| 5,161,661 | 11/1992 | Hammond | 194/209 |
| 5,226,519 | 7/1993 | DeWoolfson . | |

COMMODITY DENSIFICATION ASSEMBLY HAVING A MULTIPLE PATH DISTRIBUTION DEVICE

This application is a continuation-in-part of U.S. patent application Ser. No. 08/132,233, filed Oct. 6, 1993 now U.S. Pat. No. 5,355,987, which is a continuation of U.S. patent application Ser. No. 07/851,494, filed Mar. 16, 1992 now abandoned, both of which are incorporated by reference herein.

BACKGROUND OF THE INVENTION

1. Field of the Invention

The present invention relates to the collection, densification and storage of recyclable commodities, and more particularly to a machine for collecting, densifying and storing a plurality of different types of recyclable commodities and which can process and store each of the densified commodities separately. More particularly, it relates to an assembly which can both crush glass containers, and shred aluminum or plastic containers, and distribute the densified remains to respective segregated storage areas.

2. Description of the Prior Art

With the increasing emphasis in recent years on environmental protection, the recycling of used beverage containers and other similar commodities has become an important factor in the conservation effort. More specifically, the recycling of aluminum, glass and plastic containers has proven to be environmentally beneficial.

On the other hand, non-returnable containers for beverages and other goods are widely used because their cost has been less than the cost of recycling and/or cleaning reusable deposit containers and bottles. One significant effect of the widespread use of non-deposit containers has been increased litter in public places, and overflow of garbage dumps and landfills.

To combat litter and increase the amount of material that is recycled, several states have enacted mandatory "deposit laws" which require the use of containers having an added deposit cost. When the customer purchases a product in such a container, a container deposit, typically one to five cents, is added to the purchase price. After consumption of the product, the consumer can obtain a refund of the deposit by returning the empty container, often to the retailer, for recycling. The amount of the deposit may be adjusted to create an incentive for returning the container that is greater than the inconvenience in doing so. In these states, retailers generally collect the used containers and sell them to distributors or others who pay the retailer for the scrap value of the containers plus an amount to cover the retailer's handling costs.

Since the high labor cost of processing recycled material often makes recycling uneconomic, especially for retailers, various automatic machines that accept material for recycling and issue deposit refunds have been proposed. These machines relieve the burdens on the grocery industry and those who must collect the containers, pay the refunds, and store the returned commodities. For example, Applicants' assignee is the owner of U.S. Pat. Nos. 4,324,325, 4,345,679, 4,440,284, 4,469,212, 4,492,295 4,573,641, 4,579,216, 4,784,251, and 5,226,519. All of these patents relate to machines and systems for automated redemption of beverage containers.

Another approach to improving the economics of recycling is to increase the scrap value of the recycled material. One method for increasing the scrap value is to segregate the returned material into groups whose scrap price is inherently higher than the scrap price of unsegregated material. Separation of scrap by composition (for example, glass and plastic) or by color (for example, clear glass and green glass) greatly increases the value of the scrap material. Separation of plastic scrap further according to chemical make-up is also desirable with vinyl-based container scrap being excluded from mixture with high density polyethylene, polypropylene, and polyethylene terephthalate (PET) container scrap.

In the past, segregation of returned containers has been labor intensive, so that the labor to perform the sorting can sometimes cost more than the increase in resale value of the segregated material.

The device disclosed in U.S. Pat. No. 5,226,519 discloses a device for receiving various different types of commodities and maintaining separation of each type. However, this device includes a plurality of collection stations for receiving a plurality of commodities through a plurality of insert ports, each port for receiving one different predetermined type of commodity. The device requires the consumer to first insert all containers of one type (for example, cans) into one collection station, and receive a payment for those containers. Next, the consumer inserts containers of another type in another collection station for a separate payment. A consumer having three types of containers to recycle must therefore stand in three separate lines at three separate collection stations and receive three separate payments. Further, the multiple stations require the retailer to provide a large amount of space to house the devices.

Prior recycling machines have also been cumbersome to use because many machines require the consumer to place individual containers into the machine by hand one at a time. Therefore, a safety device was required to prevent the consumer from being injured by the machine. Prior devices have included a safety door which must be closed after inserting a container in order for the machine to accept the container and begin operation. Thus, the consumer had to insert a container, close the door, wait for the machine to operate, open the door, insert another container, close the door, etc., in order to recycle a number of containers. Further, as noted above, keeping the recycled materials separate once accepted by the machine required the consumer to walk from machine to machine inserting a different type of container in each.

When recycling densified containers, it is desirable that the different types of densified material, or "cullet," be stored in segregated storage areas. For example, aluminum cullet, glass cullet, and plastic, or PET, cullet should be segregated one from another. Furthermore, green glass cullet should be kept segregated from brown glass cullet and clear glass cullet. The same rule applies for clear and colored PET. Such segregation is important because recyclers will pay more for segregated cullet than for cross-contaminated cullet.

Such segregation, however, is difficult to achieve. After the containers have passed through the densifying device, the densified cullet must be distributed in some manner to segregated storage locations. Previous distribution systems, such as feeding paddles, forced air blowers, vacuum systems, and conveyor systems, have been inefficient at preventing the cullet from becoming cross-contaminated. This cross-contamination causes a substantial reduction in the value of the cullet.

As stated above, it is desirable to provide the capability of both crushing glass containers, and shredding aluminum and PET containers, in the same machine. Combined glass crushing and aluminum/PET shredding enables a consumer to turn in all of his recyclable containers at one machine location, rather than multiple machine locations. However, combining glass crushing and aluminum/PET shredding at one location increases the chances of cullet cross-contamination.

SUMMARY OF THE INVENTION

Accordingly, it is an object of the present invention to efficiently collect, densify and store large quantities of recyclable commodities.

It is a further object of the present invention to provide a machine that can collect, densify and store large quantities of different types of recyclable commodities while maintaining separation of each type of commodity.

Still another object of the present invention is to provide a device which can sense the color and material of composition of a commodity.

Another object of the present invention is to provide a commodity densification and distribution assembly which can densify different types of commodities, and distribute the different types of densified material to segregated storage paths without cross-contamination.

A further object of the invention is to provide a device capable of both crushing glass, and shredding aluminum or PET, at one location.

Additional objects and advantages or the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a material distribution device for distributing a plurality of different materials to a respective plurality of selected storage locations, the device including a frame, a movable member mounted on the frame, and a collection member mounted to the movable member. The collection member has an inlet for collecting the different materials and an outlet for distributing the different materials. A motor is mounted to the frame and coupled to the movable member for driving the movable member to one of a plurality of predetermined positions in which the collection member outlet is in communication with a respective storage location for distributing the different materials from the collection member to the respective storage location.

In accordance with another aspect of the invention, as embodied and broadly described herein, a commodity densification and distribution assembly, comprises a housing, including an insert port for receiving a commodity. Sensor means is disposed in the housing for sensing a feature of the commodity, and for determining whether the commodity belongs to a first group of commodities or a second group of commodities according to the sensed feature of the commodity. A crusher disposed in the housing crushes the first group of commodities into first densified material, and a shredder disposed in the housing shreds the second group of commodities into second densified material. densified material distribution means disposed in the housing collects either the first densified material or the second densified material, and responsive to the sensor means, distributes the first densified material into a first path, and the second densified material into a second path.

The distribution means may include a first distribution device mounted beneath the crusher for distributing the first densified material into one of a plurality of first paths, and a second distribution device mounted beneath the shredder for distributing the second densified material into one of a plurality of second paths.

It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of the specification illustrate a preferred embodiment of the invention. Together with the description, they serve to explain the objects, advantages and principles of the invention. In the drawings.

DESCRIPTION OF THE PREFERRED EMBODIMENTS

Reference will now be made in detail to the present preferred embodiments of the invention, as illustrated in the accompanying drawings.

Figure 11:
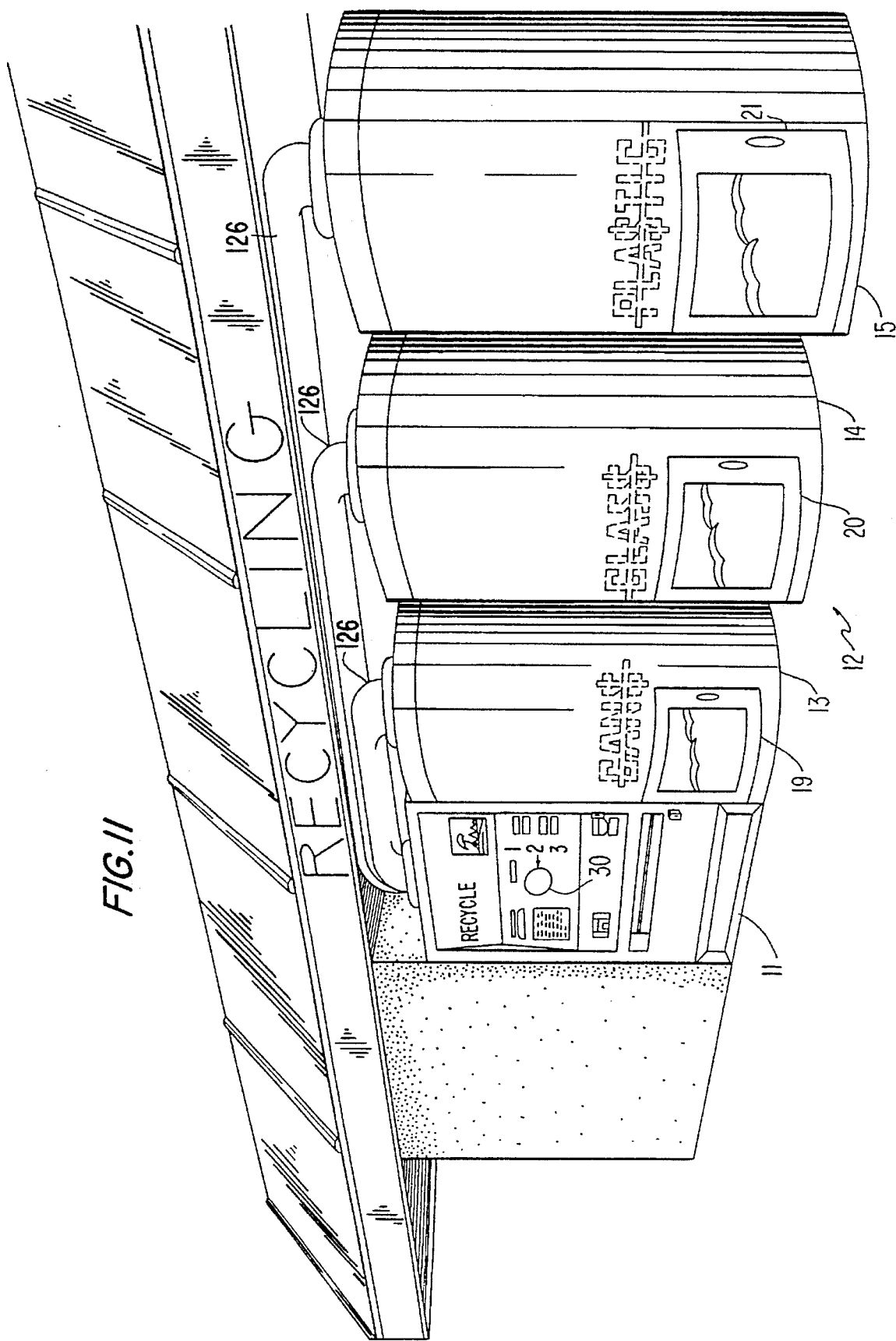
FIG. 11 is a perspective view of an embodiment of the commodity collection, densification and storage assembly of the present invention showing separate storage means for storing the densified commodity according to its composition.
Figure 12:
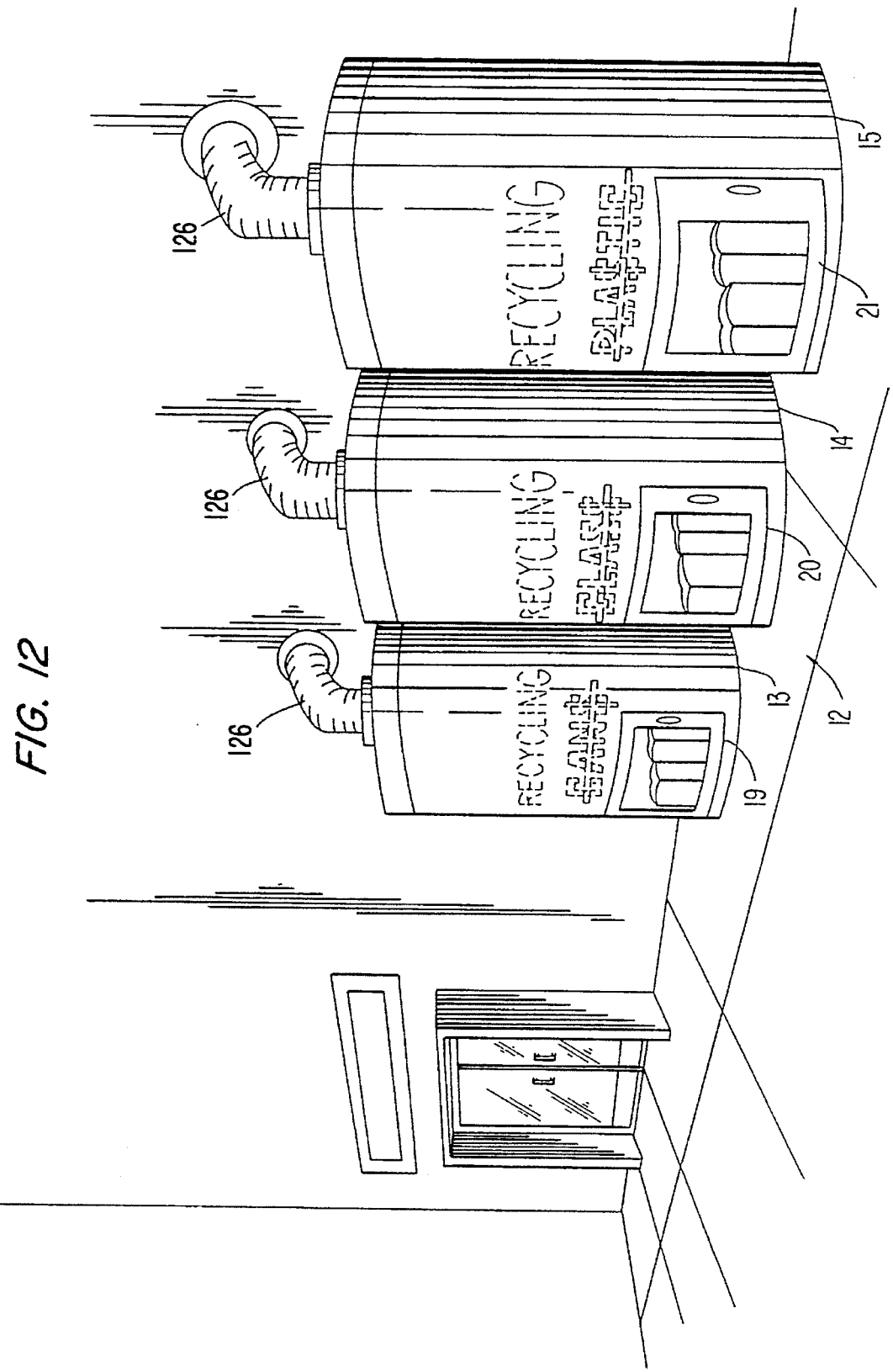
FIG. 12 is a perspective view of an alternate embodiment of the storage means for the commodity collection, densification and storage assembly of the present invention showing storage means remotely located from the housing.

In accordance with the present invention, a commodity collection, densification and storage assembly includes a housing and storage means for storing densified commodities according to composition. As broadly depicted in FIG. 11, each commodity collection, densification and storage assembly includes a housing 11, and a storage means 12. Storage means 12, as broadly described herein, may comprise, for example, a plurality of storage bins 13, 14 and 15 for storing densified commodities separately according to the composition of the commodity. A consumer may insert a plurality of recyclable commodities of different compositions into the housing 11. As shown in FIGS. 11 and 12, each storage bin may receive one type of densified commodity. For example, storage bin 13 stores densified aluminum, storage bin 14 stores densified glass, and storage bin 15 stores densified plastic. Alternately, one storage bin containing a number of storage compartments with each compartment storing a different densified commodity may be provided. Further, additional storage bins or compartments may be provided for storing densified commodities of the same composition but of a different color. For example, a separate bin or compartment may be provided for storing clear glass, green glass, and brown glass, or for storing clear plastic, and colored plastic.

As shown in FIG. 12, the storage bins 13, 14 and 15 may be located remotely from the housing 11. Such an arrangement is beneficial to a retailer lacking space for the housing 11 and storage bins 13, 14 and 15 all in one location. Each of the storage bins 13, 14 and 15 is connected to the housing 11 by conduits 126 which carry the densified commodity from the housing to the bins. Preferably, each of the storage bins 13, 14 and 15 includes an access opening 19, 20 and 21, respectively, for removing densified commodities from the storage bin.

Alternatively, a plurality of housings 11 may be provided together in one location to allow a number of consumers to simultaneously insert recyclable commodities. Where a plurality of housings 11 is provided, each may be attached to a separate set of storage bins 13, 14, 15 or each housing may be attached to the same set of storage bins with a given bin receiving all of one type of recyclable commodity from all of the housings.

Figure 3:
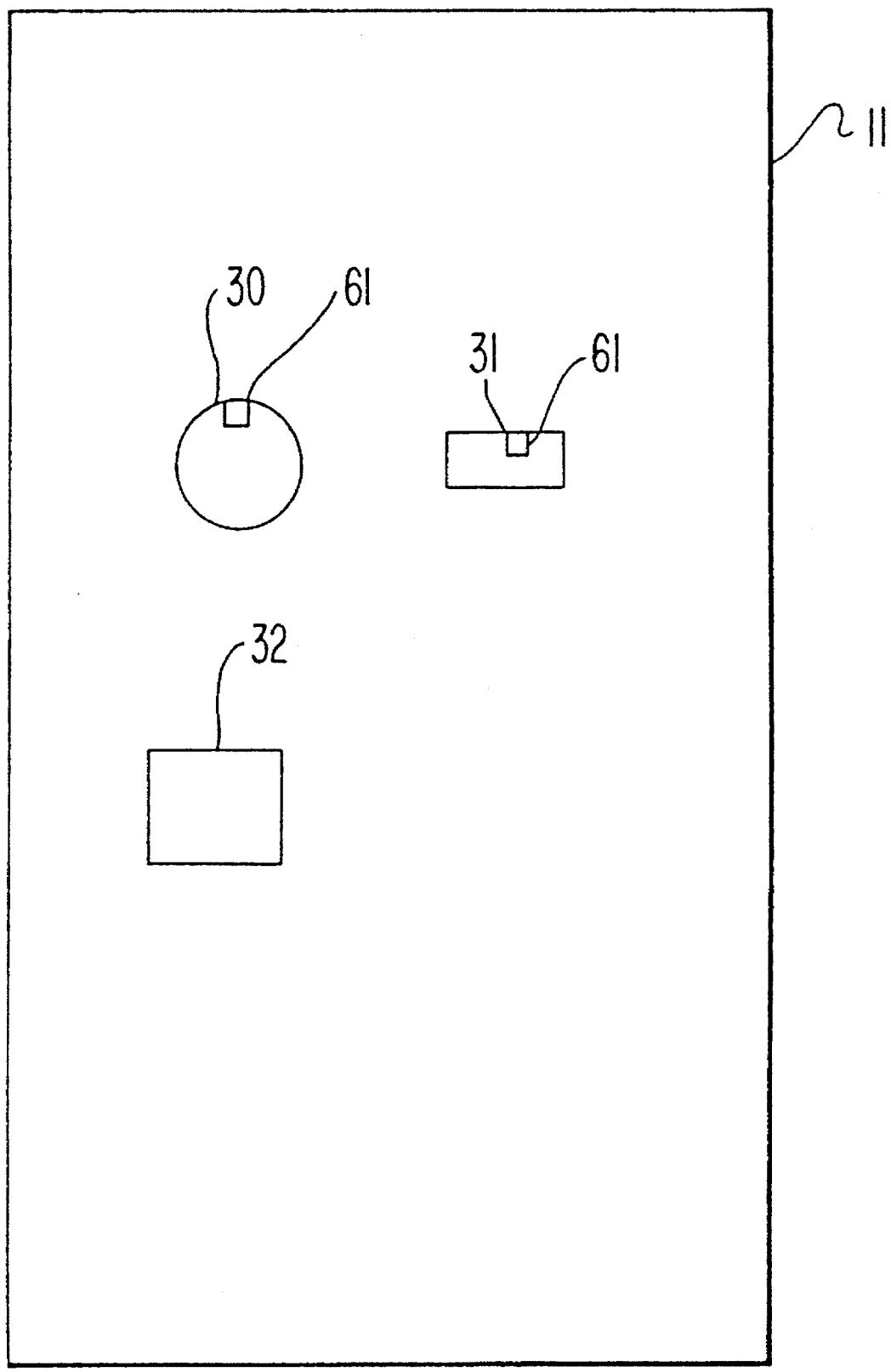
FIG. 3 is a partial front view of a commodity collection, densification and storage assembly of the present invention showing a housing having insert means comprising a generally rectangular insert port and a generally round insert port.

In accordance with the invention, the commodity collection, densification and storage assembly includes insert means in the housing for receiving a commodity. As broadly embodied in FIG. 3, insert means may comprise, for example, a generally round insert port 30 for receiving generally cylindrical commodities. The assembly may also include, as shown in FIG. 3, a generally rectangular insert port 31 for receiving generally rectangular commodities. The assembly may include either port 30 or 31 or both together without departing from the scope of the invention. Generally cylindrical commodities include, for example, glass and plastic bottles and metal cans. Generally rectangular commodities include, for example, a cardboard box, most often used to contain noncarbonated drinks.

Figure 2:
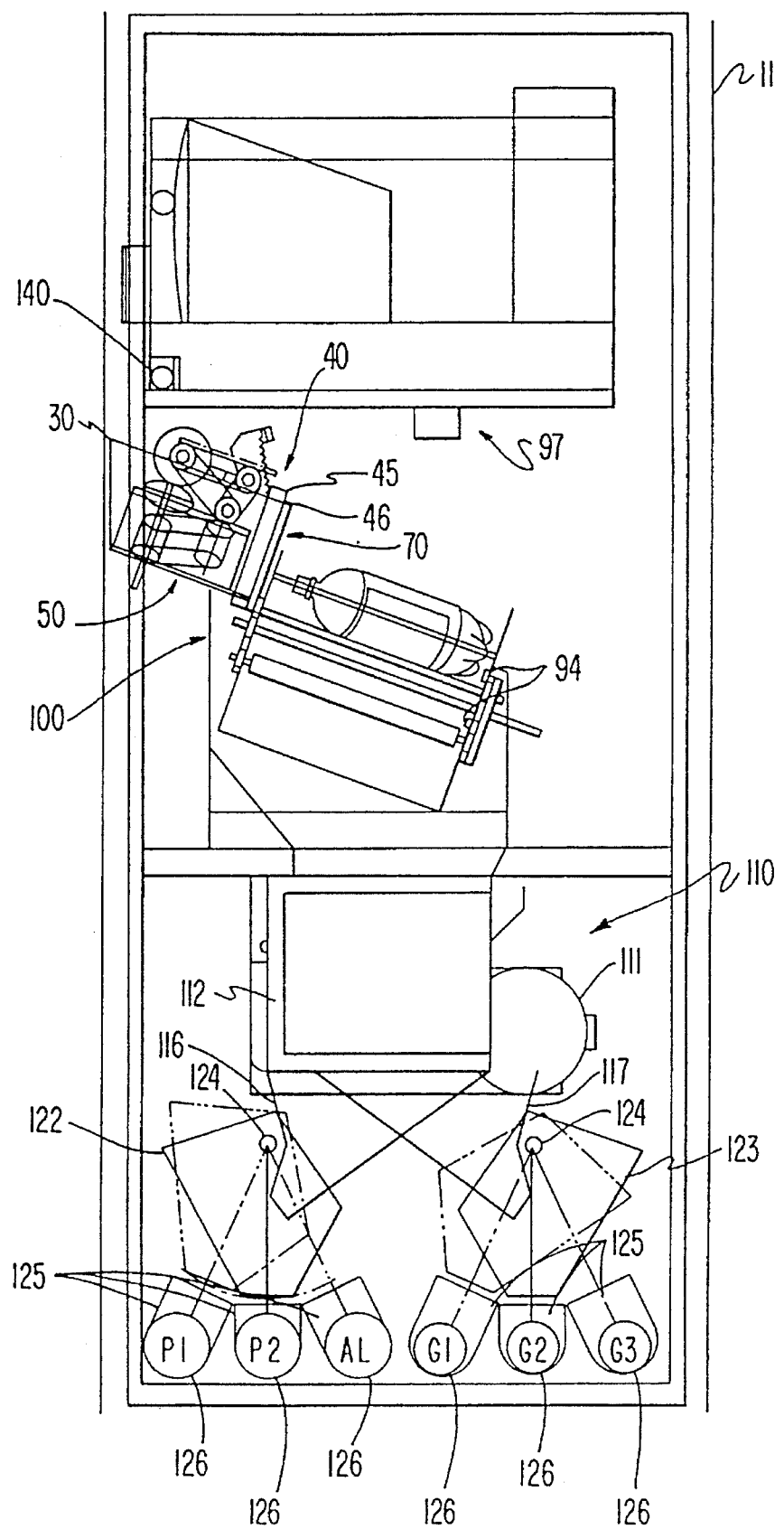
FIG. 2 is a side cutaway view of the commodity collection, densification and storage assembly of the present invention as shown in FIG. 1.
Figure 4:
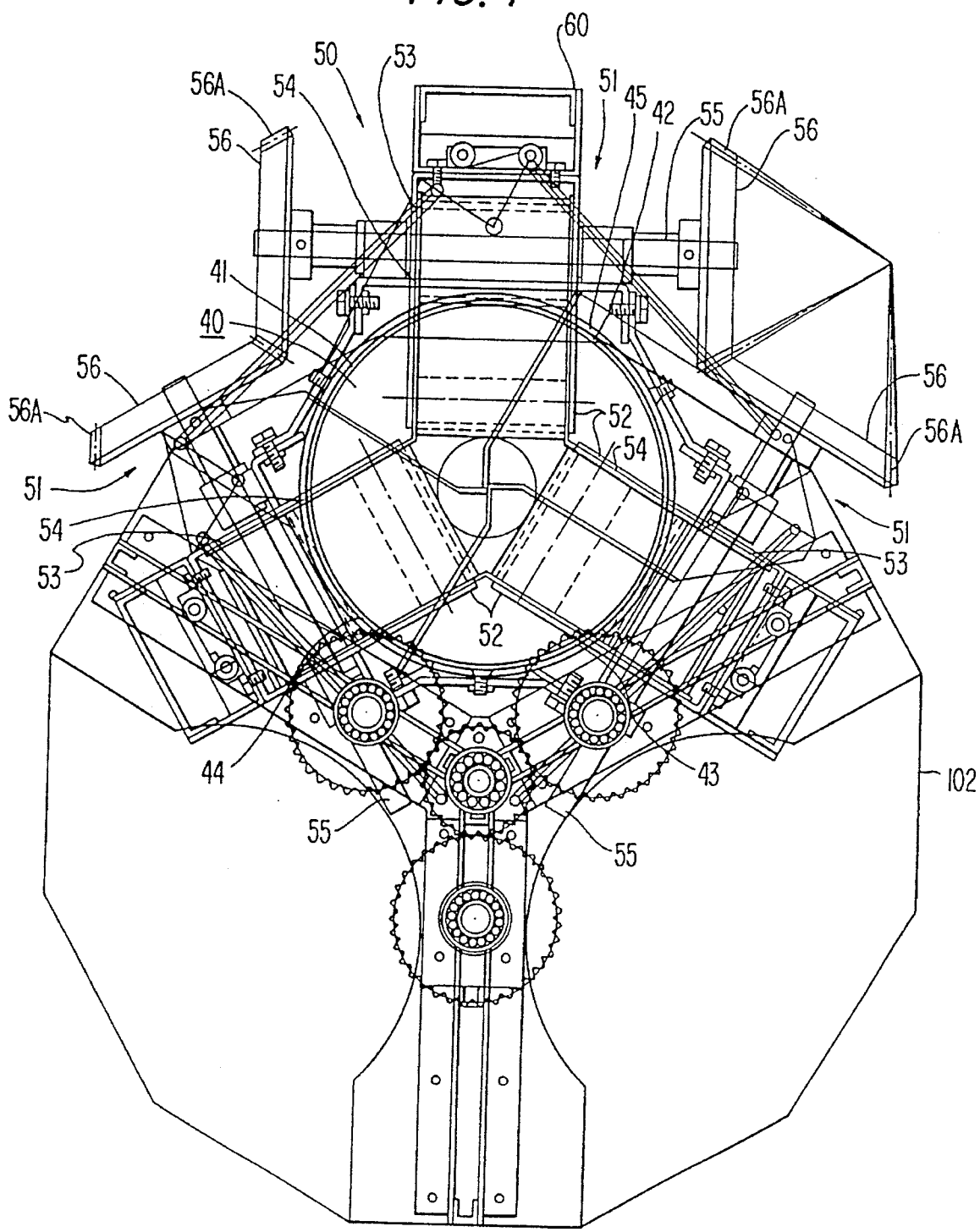
FIG. 4 is a front view of the commodity collection, densification and storage assembly of the present invention showing an enlarged view of the insert means, gate means, and intake means.
Figure 5:
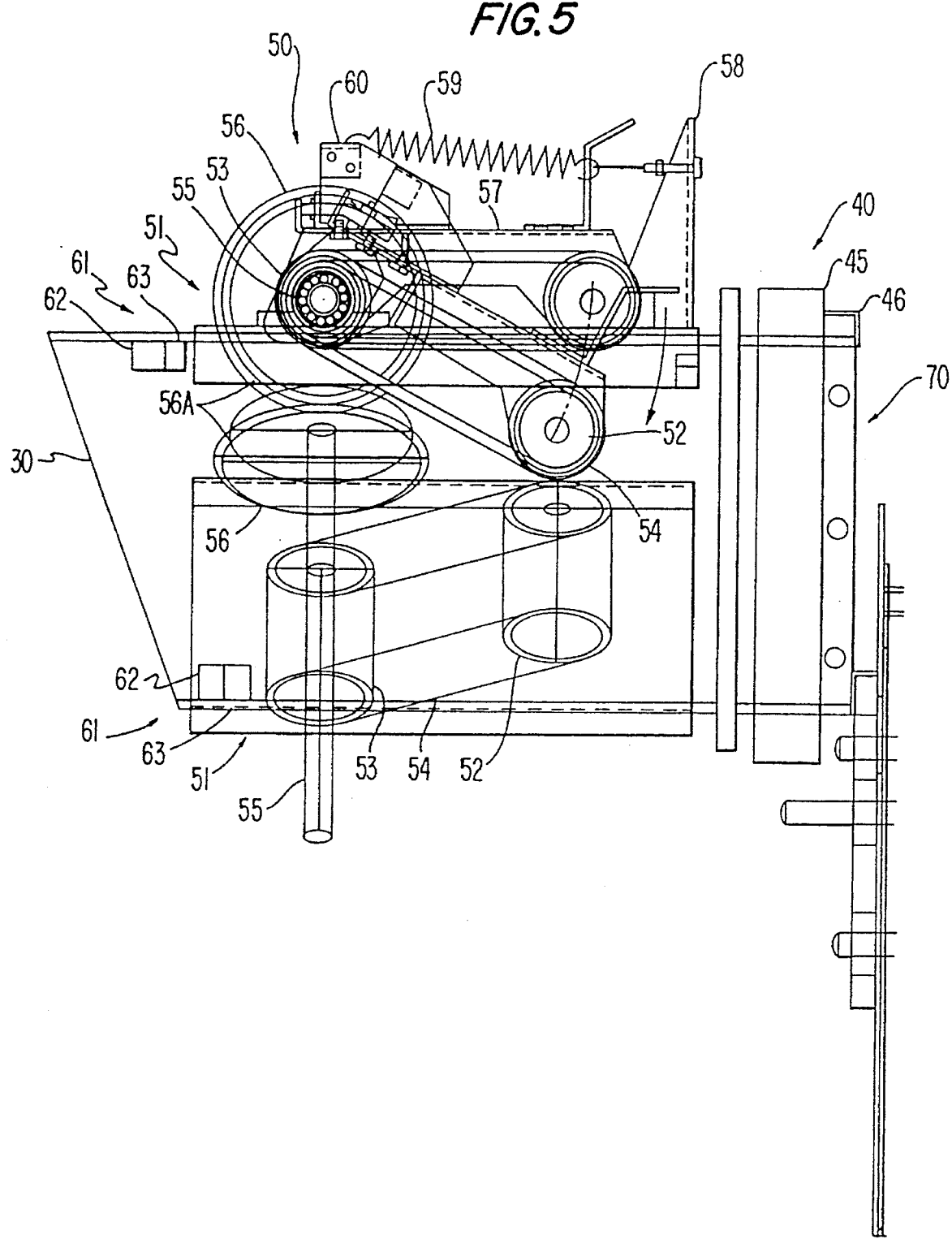
FIG. 5 is a side view of the insert means, gate means, intake means, and first and second sensor means of the present invention.

In accordance with the invention, gate means is provided adjacent the insert means movable between an open and a closed position, for allowing the commodity to pass therethrough into the housing. Gate means may include a mechanical gate mechanism or an "iris." FIGS. 2, 4 and 5 show a gate mechanism 40 adjacent to the insert port 30. The gate mechanism 40 is movable between an open and closed position, for allowing the commodity to pass therethrough into the housing 11. The gate mechanism 40 is shown in the closed position in FIG. 4.

The gate mechanism 40, as embodied in FIG. 4, comprises a plurality of movable plates 41–44 held within a ring 45. The plates 41–44 are opened by a solenoid switch (not shown) against the force of a spring (not shown) to allow an inserted commodity to pass through the ring 45 and further into the housing 11. Once the inserted commodity passes through the gate mechanism 40, the solenoid switch is turned off. The plates 41–44 thus return to the closed position of FIG. 4 by the spring force. The plates 41–44 preferably return to the closed position within milliseconds after the solenoid valve is turned off.

More preferably, the plates 41–44 are opened by a motor to allow an inserted commodity to pass through the ring 45 and further into the housing 11. Once the inserted commodity passes through the gate mechanism 40, the motor returns the plates 41–44 to the closed position of FIG. 4.

In accordance with the invention, intake means is provided for drawing the commodity from the insert means through the gate means. Intake means may include belts, a roller assembly, or the like. As broadly embodied in FIGS. 1, 2, 4, and 5, the intake means comprises an intake device 50 including at least one roller 52 which rotates in a direction to draw an inserted commodity into the housing 11 and through the gate means 40. Preferably, the intake device 50 may also advantageously include at least one roller assembly 51 including a pair of rollers 52, 53 and a rotatable belt 54 disposed therebetween. Each roller 53 is mounted on a rotatable shaft 55 for driving the rotation of the roller. As the shaft 55 of each roller assembly 51 is driven, the attached roller 53 rotates causing the corresponding belt 54 to rotate, thereby causing roller 52 to rotate. The rotation of the belt 54 about the rollers 52, 53 draws the inserted commodity into the housing 11.

Preferably, a gear 56 is mounted on at least one end of each shaft 55. Each of the gears 56 mounted on a shaft 55 meshes with another gear 56 mounted on another shaft 55. Therefore, any rotation of one shaft 55 causes the rotation of the other shafts due to the interlocking gears 56. Each gear 56 has a bevelled edge 56a for contacting the beveled edge 56a of an adjacent gear 56. The bevel angle of the bevelled edge 56a may vary with the number and placement of roller assemblies 51 within the housing 11.

Figure 1:
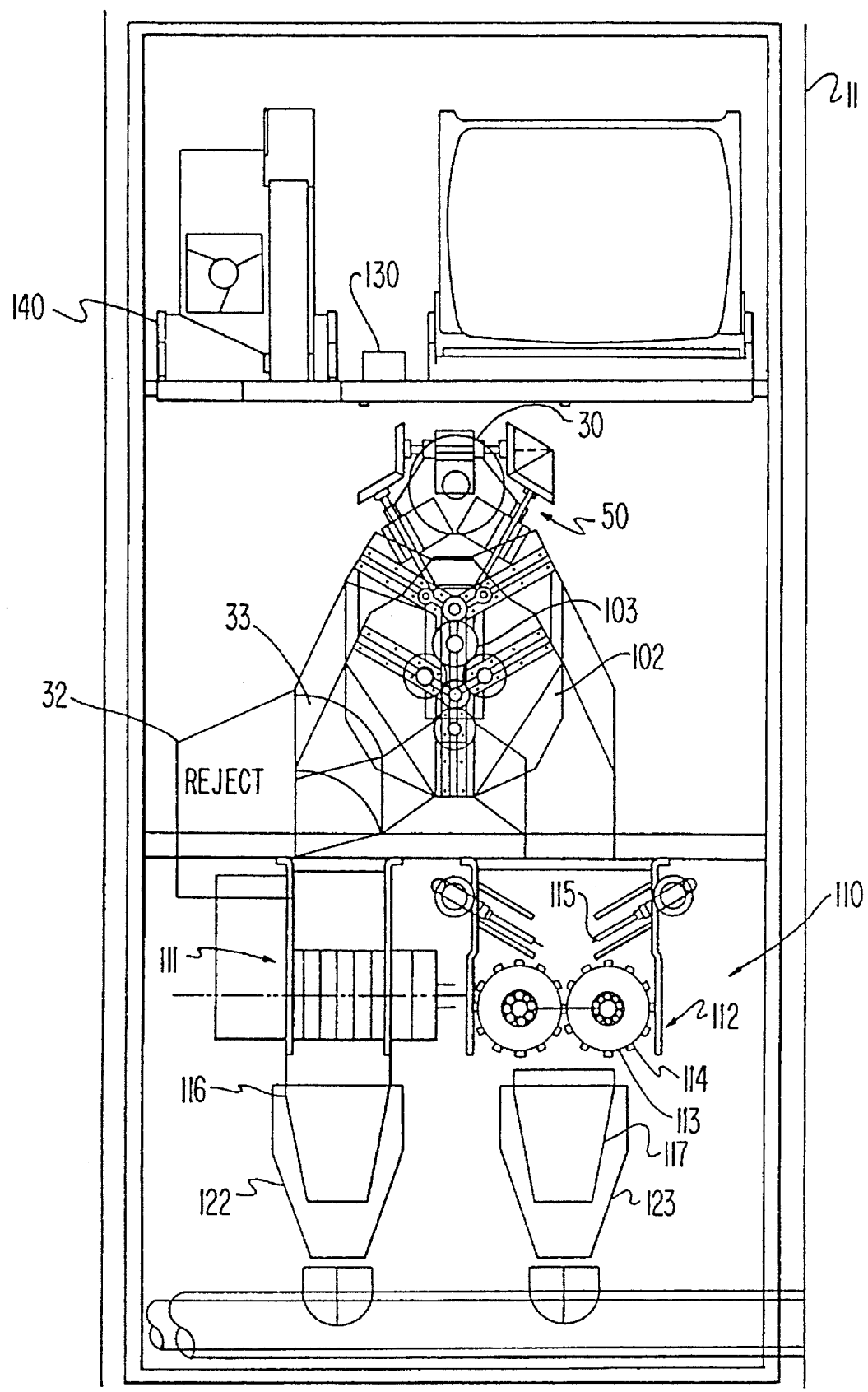
FIG. 1 is a front cutaway view of the commodity collection, densification and storage assembly of the present invention showing various elements of the assembly arranged within the housing.

As shown in FIGS. 1, 4 and 5, the intake device 50 preferably comprises three roller assemblies 51 and therefore three shafts 55. The gear 56 may be disposed at either or both ends of the shafts 55 so long as all of the shafts are driven together simultaneously. As best shown in FIG. 4, the uppermost shaft 55 may have two gears 56, one each for contacting the gear of the two lower shafts, while the lower shafts have only one gear. Alternatively, each shaft 55 may have two gears 56 thereby placing each shaft in rotational contact with the other two. While the intake device 50 is shown to include three roller assemblies 51, the present invention is not limited to such, and a device with a different number of roller assemblies is still within the scope of the present invention.

As shown in FIG. 5, the intake device 50 is adjustable to conform to the size of the inserted commodity. Each roller 52 is rotatably mounted on an arm 57 which is pivotally mounted so as to be partially rotatable about, but not fixed to, the shaft 55. As shown in FIG. 5, each roller assembly 51 includes a post 58 fixed to the housing 11 to which a spring 59 is attached. The spring 59 is also attached to a crosspiece 60 fixed to the arm 57. The spring 59 is loaded in tension thereby urging the arm 57 to rotate about the shaft 55 in the direction of arrow F, as shown in FIG. 5. The spring 59 thus causes the rollers 52 to come together in the center of the intake device 50 as shown in FIG. 4. However, each arm 57 of the roller assembly 51 is movable in the direction opposite to the arrow F in FIG. 5 in order to allow larger commodities to pass into the housing.

Alternatively, in accordance with the invention, the intake device 50 may include a roller or wheel assembly. A preferred intake device 50 includes three sets of rollers aligned along the bottom of the intake device 50 to provide a path for an inserted commodity to be drawn into the housing 11 and through the gate means 40. A rubber wheel is mounted on a rotatable shaft along the top of the intake device 50. The wheel is supported by a pivot assembly for adjusting to conform to the size of the inserted commodity. The rotating wheel pivots down until it contacts the commodity. The commodity is forced between the rollers at the bottom of intake device 50 and the wheel. The rotating wheel draws the commodity through the gate. The alternative intake device 50 advantageously provides for faster indexing of the commodity.

Preferably, the intake device 50 is activated by an optical sensor, such as a conventional electric-eye, or an acoustic device for detecting the presence of an object within the insert port 30. As broadly embodied herein and shown in FIGS. 3 and 5, an optional sensor, or more particularly, an infrared sensor device 61 senses the presence of an object inserted into either the round insert port 30 or rectangular insert port 31.

Preferably, the optical sensor device 61 comprises at least one infrared sensor including an emitter 62 and a receiver 63 disposed within each insert port 30, 31. When an object is placed into the insert port 30, 31, the infrared light emitted by each emitter 62 is reflected off the object and received by the receivers 63. The infrared sensor device 61 preferably includes a plurality of such infrared sensors for improved sensing.

When a commodity is inserted into the intake device 50, the infrared light emitted by the emitters 62 reflects off the object and is received by at least one of the receivers 63. Upon reception of infrared light, a microprocessor 225 activates a motor (not shown) which drives the shafts 55 causing the belts 54 to rotate in a direction to draw the inserted commodity into the machine. The electric motor may be rotationally connected to one of the shafts 55, or a plurality of electric motors may be provided, each motor being attached to a different shaft 55. The electric motor or motors are switched off after a predetermined period of time sufficient for the intake device 50 to draw the inserted commodity through the gate mechanism 40.

In accordance with the invention, a first sensor means is provided for sensing the presence of an object in the gate means. As broadly embodied herein and as shown in FIGS. 2 and 4, the first sensor means comprises a first sensor device 46 for detecting the position of the plates 41–44 after the solenoid valve (not shown) has been shut off thereby releasing the plates to return to the closed position, as shown in FIG. 4. The spring (not shown) urges the plates 41–44 toward the closed position.

Preferably, the spring will cause the plates 41–44 to return from the opened to the closed position within milliseconds. If the plates 41–44 have not returned to the closed position milliseconds after the solenoid valve has been shut off, the solenoid valve is reactivated thereby reopening the gate mechanism 40. The intake device 50, including the roller assemblies 51, and other moving parts within the housing 11 are also shut off. In operation, the reopening of the gate mechanism 40 and stopping of the intake device 50, prevents clogging and damage to the intake device and gate mechanism upon insertion of inappropriate objects. More importantly, injuries are prevented to consumers who either intentionally or accidentally stick a hand into the device, possibly getting caught by a watch or ring. A message may then be given to the consumer explaining that the gate means should be cleared, and only recyclable commodities should be inserted into the intake device 50. Thus, the opening and closing of an outer door by the consumer in order to effect repeated insertion of commodities is advantageously avoided by the present invention. As previously stated, an alternative embodiment to the solenoid valve and spring arrangement utilizes a motor to open and close the plates 41–44.

Figure 9:
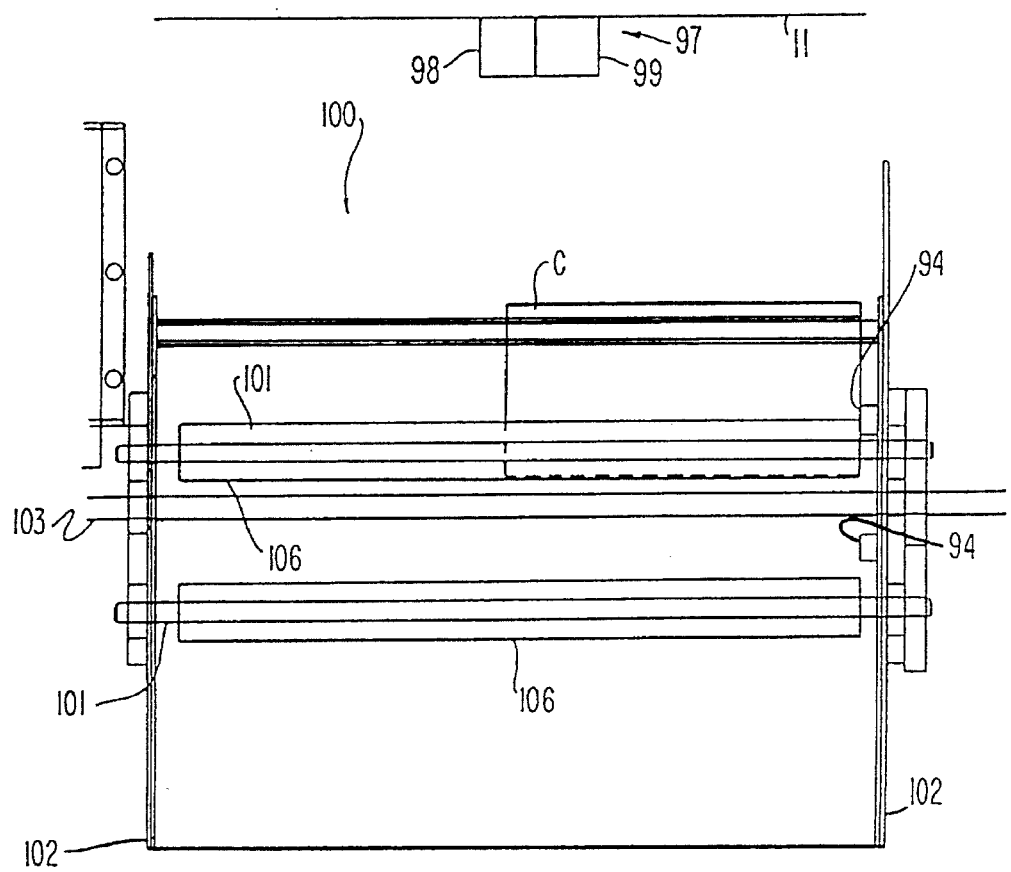
FIG. 9 is a side view of the separation means of the present invention.

In accordance with the invention, a second sensor means is provided for verifying whether the inserted commodity is a participating commodity and for determining a composition of the commodity. As broadly embodied herein, the second sensor means comprises a second sensing device 70 adjacent the gate mechanism 40, as shown in FIGS. 2 and 5, for determining a composition of the commodity. In order to determine whether an inserted commodity is a "participating" commodity, as broadly embodied herein and as shown in FIGS. 2 and 9, the second sensor means may further comprise an optional laser scanning device 97 attached to the housing 11 for detecting the presence of and reading a barcode (UPC).

As disclosed in U.S. Pat. No. 4,784,251, owned by Applicants' assignee, the description of which is incorporated herein by reference, the laser scanning device 97 may include a low power laser emitter 98 and a laser reader 99. The inserted commodity C is scanned while positioned atop two of the rods 101 and the shaft 103 of the separation device 100, which will be described later in detail. The laser emitter 98 of the laser scanning device 97 projects a light pattern across the surface of the inserted commodity which is received by the laser reader 99 thereby reading the barcode. The rods 101 and shaft 103 are rotatable to also rotate the inserted commodity to ensure that the laser scanning device 97 reads the barcode.

If the laser scanning device 97 does not detect a barcode on the inserted commodity, the commodity is rejected and is therefore a "nonparticipating commodity" which is returned to the consumer through the reject port 32. Further, if the laser scanning device 97 does detect and read a barcode but cannot match that barcode with a predetermined list of container barcodes, the inserted commodity is also rejected as a nonparticipating commodity.

The laser scanning device 97 rejects commodities as nonparticipating if a barcode is not found in order to reject any nonrecyclable object which might be inserted into the assembly, thereby preventing mixture of recyclable commodities with waste material or damage to the assembly. The laser scanning device 97 also rejects objects without a barcode or with barcodes that cannot be matched because retailers and distributors of the containers are compensated for recycling and billed for the scrap value of the material through use of information obtained by reading the barcode. The proper credits and debits cannot be made if a barcode cannot be read and matched. Thus, a number of barcodes are placed in the memory of the laser scanning device 97 so that various different containers may be accepted.

If the laser scanning device 97 does detect, read and match a barcode, the commodity is a "participating commodity," and the commodity is densified and stored according to other information obtained by the second sensor device 70. However, use of the laser scanning device 97 is optional, and commodities may be sorted based on information obtained solely by the second sensor device 70 without the laser scanning device.

If two insert ports 30, 31 are provided, a second corresponding set of an intake device 50, a gate mechanism 40, a first sensor device 46, and a laser scanning device 97 may be provided adjacent the inset port 31 for processing the inserted cardboard boxes. However, after reading the barcode, participating cardboard commodities may be fed by a separation wheel 100, described in detail below, directly to densification means since no further segregation by color or composition is required. The cardboard densifying device may comprise the shredding mechanism 111 discussed in detail below, or may be a separately provided shredding mechanism.

Figure 6A:
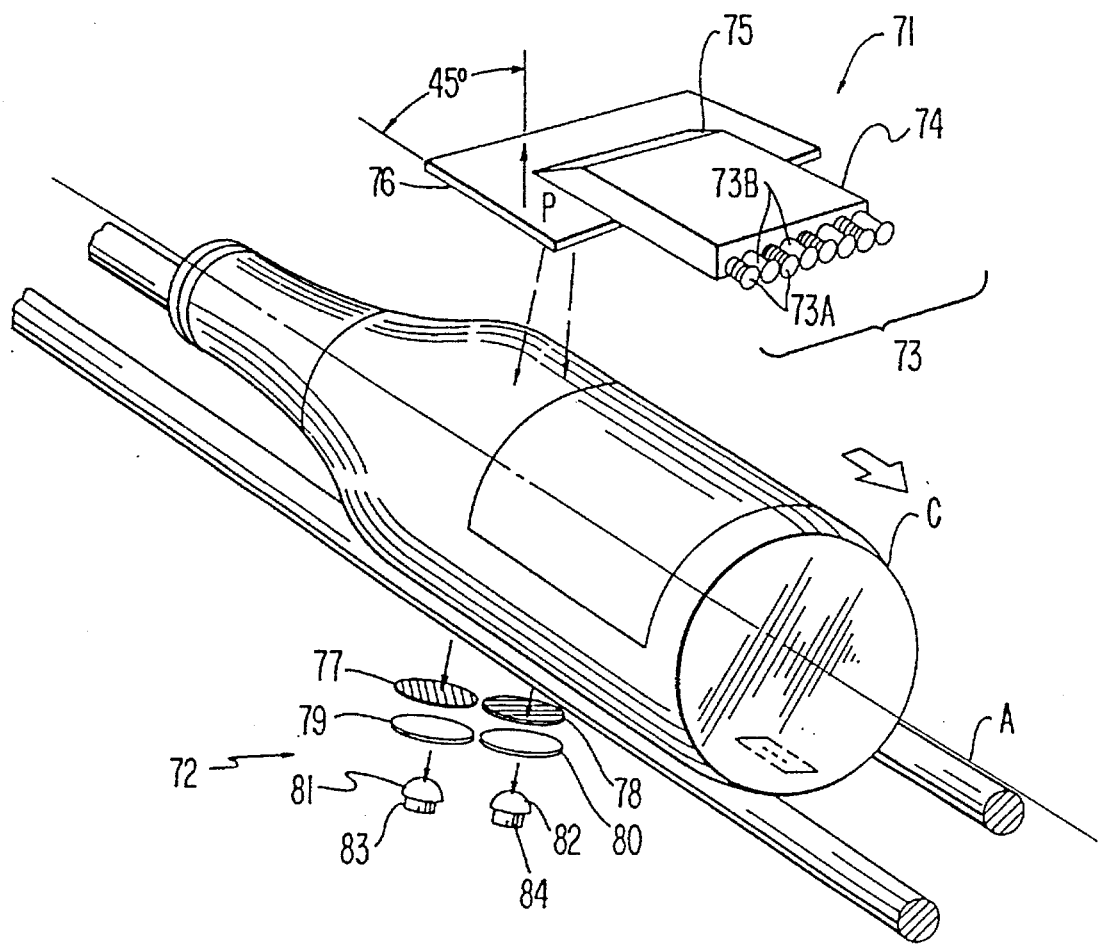
FIG. 6A is a perspective view depicting operation of the second sensor means for determining a composition and color of the inserted commodity.
Figure 6B:
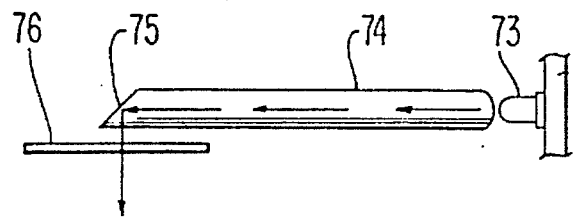
FIG. 6B is a side view of the second sensor means of FIG. 6A showing the path of the sensing light beam through the optical coupler.
Figure 6C:
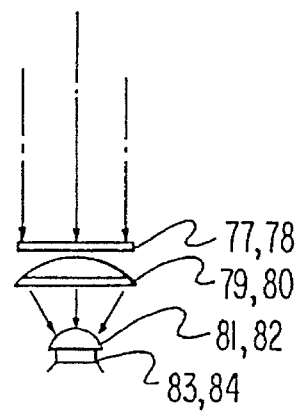
FIG. 6C is a side view of the second sensor means as in FIG. 6A showing the path of the sensing light beam through the lenses to the photodiode.

Preferably, the second sensor means senses a commodity composed of glass or plastic and further senses a color of the commodity. As broadly embodied herein and as shown in FIGS. 6A, 6B, and 6C, the second sensor device 70 comprises means for sensing the composition and color of glass and plastic commodities. Such a sensing device is disclosed in U.S. Pat. No. 4,919,534, owned by Applicants' assignee, the description of which is incorporated herein by reference. In such a device, an inserted commodity C passes between a light source assembly 71 and a light analyzer assembly 72. The light source assembly 71 includes a plurality of light emitting diodes 73 disposed opposite an optical coupler 74 made of optical plastic. The diodes 73 include two different types 73a, 73b, which emit two different wavelengths of light and are spaced alternately across the optical coupler 74. Inside the optical coupler 74, the light from the diodes 73a, 73b is diffused from that of discrete points into a continuous band of light having different wavelengths through a reflection on surface 75. The reflected light passes through a polarizing plate 76 which polarizes the light in the direction shown by arrow P in FIG. 6A. For best detection of PET and exclusion of vinyl, the polarizing direction of plate 76 should be preferably offset 45° from the direction of the center axis A of the inserted commodity C.

The light beam then passes through the container C (if the container is at least partially transparent) and is received by the light analyzer assembly 72. The light analyzer assembly 72 includes a parallel polarizer 77 having a polarization direction parallel to that of polarizing plate 76, and a cross polarizer 78 having a polarization direction orthogonal to the polarization direction of the polarizing plate 76. The portions of the light beam emitted by the diodes 73 which pass through the polarizers 77, 78, then pass through converging lenses 79, 80 and field lenses 81, 82 to be received by photodiodes 83, 84.

Through use of a microprocessor 225, the second sensor device 70 determines the composition of the commodity C by evaluating whether the polarization of the light passing through the container was changed from the direction P of the polarizing plate 76 thereby allowing light to be received by the photodiode 84 corresponding to the cross polarizer 78. Glass and vinyl containers do not scatter or alter the polarization of light passing through them. Therefore, just as if no container or an opaque object were present, no light passes through the cross polarizer 78 after passing through a glass or vinyl container. PET and polystyrene containers do alter the polarization, therefore light does pass through the cross polarizer 78 after passing through the container C. It is believed that this effect is caused by the molecular structures of the containers and the methods of their manufacture.

The second sensor device 70 determines the color of the inserted commodity by determining how much of each wavelength of light from the different colored diodes 73a, 73b was absorbed in passing through the commodity. Two different photodiodes 83, 84 are required for color sensing because sensing the color of both scattering and nonscattering containers must be performed after the light passes through the polarizers 77, 78.

Alternately, instead of different colored diodes 73a, 73b, white light could be generated and then filtered to provide varying wavelengths of light to perform the color sensing via a separate mechanism. Therefore, for composition sensing, only one color diode would be necessary in the above light source assembly 71. Further, only one photodiode 84 and the cross polarizing plate 78 are required for composition sensing.

Alternatively, instead of the device of FIGS. 6A–6C, a color and composition sensor may be employed such as that disclosed in U.S. patent application Ser. No. 08/144,030, filed Nov. 1, 1993, owned by Applicants' Assignee, and incorporated by reference herein.

Opaque commodities may be handled in a similar manner as discussed above. However, reflective optical waves, preferably within the visible spectrum, would be used to determine commodity color. This alternative measures the light reflected off of the commodity opposed to the light passing through the commodity.

Figure 7A:
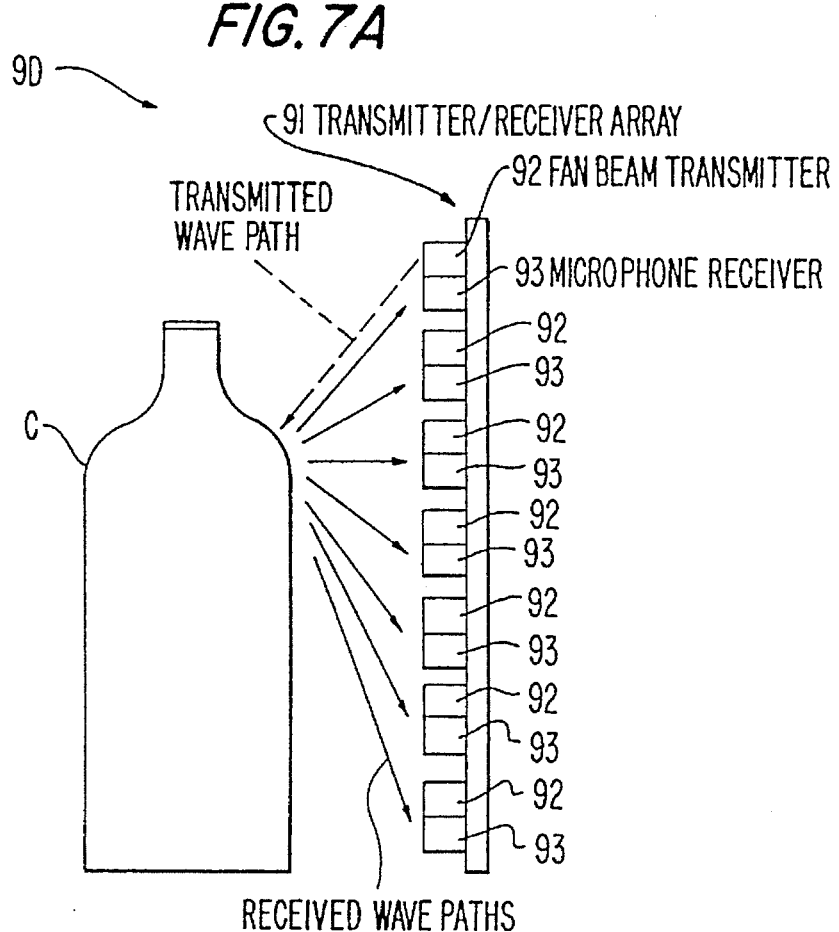
FIG. 7A is a diagrammatic side view of another possible sensing mechanism which can be included as an option, with an optical device for use with the second sensor means, for determining the shape of an inserted commodity showing transmitted and received wave signal paths.
Figure 7B:
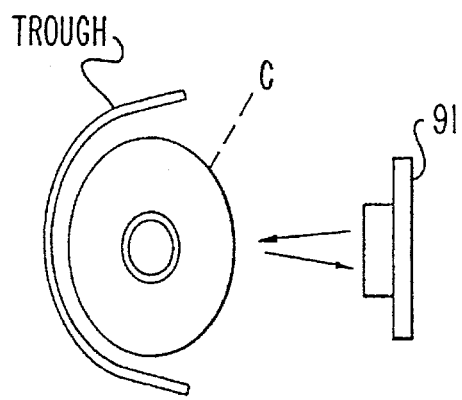
FIG. 7B is a top view of the mechanism shown in FIG. 7A, showing the arrangement of the inserted commodity and the transmitter/receiver array.

As an option, the second sensor means may include a mechanism for sensing the shape of a commodity. As broadly embodied herein and as shown in FIGS. 7A, 7B and 7C, second sensor device 70 may further include an acoustic measurement device 90 for sensing the shape of an inserted commodity C. Such an acoustic measurement device 90 is disclosed in U.S. Pat. No. 5,068,835, owned by Applicants' assignee, the description of which is incorporated herein by reference. The acoustic measurement device may include a transmitter/receiver array 91 including a plurality of pairs of fan beam transmitters 92 and microphone receivers 93. The transmitters 92 transmit a high frequency ultrasonic signal, preferably with a frequency of approximately 50 kHZ and a wavelength of approximately 0.27 inches. The receivers 93 measure the phase of the reflected signals from the transmitters 92. A microprocessor 225 compares the received data to precalculated reference data corresponding to various different containers in order to recognize the shape of the container.

An alternative embodiment for the mechanism for sensing the shape of a commodity uses an optical sensor. The optical sensor is preferably a CCD array that senses a plurality of pixel locations. The optical sensor senses the commodity from one or more directions to determine commodity shape.

The second sensor means may also optionally sense a weight of the commodity. As broadly embodied herein and as shown in FIGS. 2 and 9, the second sensor device 70 may include at least one weighing device 94 for sensing the weight of a commodity so that an object above a predetermined weight is returned to the consumer via the reject port 32. The weighing device 94 may comprise at least one compression scale or piston disposed on the end plate 102 of the separation wheel 100, as will be described later in detail, and weighing may be performed either before or after reading of the barcode by the laser scanning device 97. Due to the slant of the separation wheel 102 from the horizontal, commodities passing through the gate mechanism 40 will settle against the weighing device 94. Rejection of overly heavy items prevents passing of full containers or other inappropriate objects to the densification assembly 110 which could result in undesirable mixture of waste with densified commodities and potential need for maintenance of the assembly due to fouling, clogging or damage.

Alternatively, the weighing device 94 may be an electronic weighing device such as a strain gauge. The strain gauge preferably includes a piezoelectric film that flexes under the weight of the commodity. The flexure of the film is used to electronically determine commodity weight.

Figure 8:
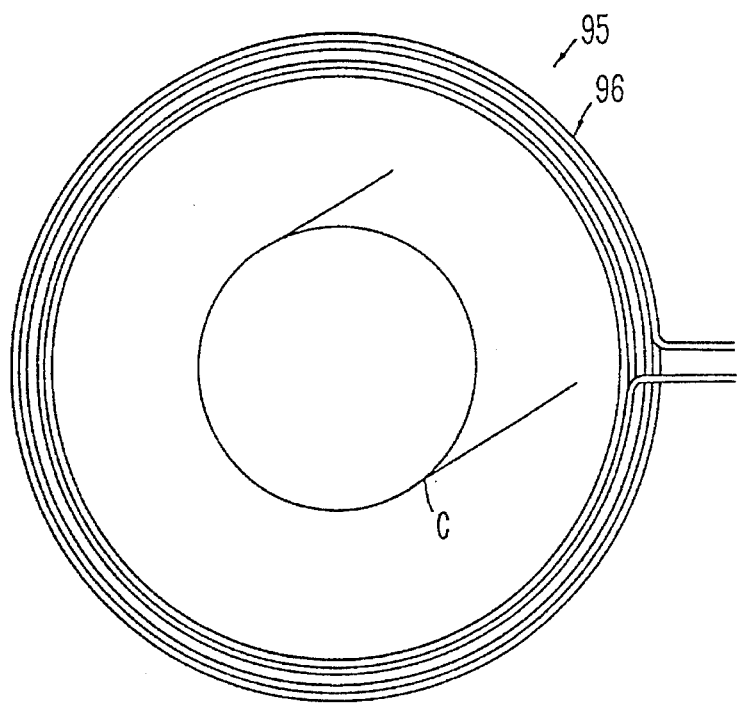
FIG. 8 is a perspective view of the second sensor means for determining the composition of a commodity showing a coil for sensing a metal can.

Preferably, the second sensor means senses a commodity composed of metal. As broadly embodied herein and as shown in FIG. 8, the second sensor device 70 may also include a metal sensor 95 comprising an electrified coil 96 through which the inserted commodity C passes. Such a metal sensor 95 is disclosed in U.S. Pat. No. 5,028,870, owned by Applicants' Assignee, the description of which is incorporated by reference herein. In the metal sensor 95, a current passes through the coil 96 creating an electromagnetic field. The metal sensor 95 may measure change in phase and amplitude of the electromagnetic field caused by the inserted commodity to differentiate aluminum and steel commodities. The metal sensor 95 may also measure the change in voltage across the coil caused by insertion of the commodity. Steel commodities will cause a change in voltage of much greater magnitude than will aluminum commodities. Plastic or glass commodities will cause virtually no change in voltage. After sensing by the metal sensor 95, aluminum commodities are densified, and steel commodities are returned to the consumer via the reject port 32.

In accordance with the invention, separation means responsive to the second sensor means is provided for separating various commodities according to the determined composition prior to entry into the densification means. After the inserted commodity has been sensed by the second sensor means, it is passed to separation means. As broadly embodied herein and as shown best in FIGS. 2, 4 and 9, the separation means comprises a separation wheel 100 including a plurality of rotatable rods 101 mounted between two end plates 102. The end plates 102 are rotatable around a central axis colinear with the axis of a shaft 103 which is rotatable either independently of or in conjunction with the end plates. Each rod 101 is rotatably supported by a pair of gears 104 secured to each end of the rod. The shaft 103 is rotatably supported by a pair of gears 105 secured to the end of the shaft. Transfer gears (not shown) are rotatably mounted on the end plates 102 to mesh in between the gears 104 and 105 supporting the rods 101 and the shaft 103, respectively. Rollers 106 may be provided about each of the rods 101.

As described above, the second sensor means as broadly embodied herein comprises a laser scanning device 97 which employs the rods 101 and shaft 103 to rotatably support the inserted commodity C. The above-described rotation of the inserted commodity C is accomplished through rotation of the shaft 103 by an electric motor (not shown) while preventing rotation of the end plates 102. The transfer gears and other gears 105 thus cause the rods 101 to rotate in the same direction as the shaft 103. The rotation of the rods 101 and shaft 103 causes the inserted commodity to rotate for reading of a barcode by the laser scanning device 97.

Responsive to the second sensor device 70, the entire separation wheel 100 including the end plates 102 is driven about the shaft 103 in order to separate the various inserted commodities. The separation wheel 100 separates the inserted commodities into a first group of commodities consisting of glass commodities and a second group of commodities consisting of plastic and aluminum commodities for insertion into the densification assembly 110. As best shown in FIG. 1, the separation wheel 100 is rotatable about the shaft 103 in both a clockwise or counter clockwise direction. The separation wheel 100 rotates clockwise 120° responsive to the second sensor device 70 determining that the inserted commodity C atop the wheel is a glass commodity. The separation wheel 100 rotates counter clockwise 120° responsive to the second sensor device 70 determining that the inserted commodity atop the wheel is a plastic or aluminum commodity, or is to be returned to the consumer via the reject port 32 as a nonparticipating commodity or a nonrecyclable commodity.

If the commodity is nonparticipating or nonrecyclable, a movable door 33 blocks the commodity from reaching the densification means and routes it to the reject port 32. If the commodity is plastic or aluminum, the door 33 instead blocks the commodity from reaching the reject port 32 and routes it to the densification means.

In accordance with the invention, densification means is provided for densifying the commodity. As broadly embodied herein, densification means comprises a densification assembly 110 including both a shredding mechanism 111 and a crushing mechanism 112. The shredding mechanism 111 densifies commodities of the second group, namely, the plastic and aluminum commodities received from the separation wheel 100.

The shredding mechanism 111, generally depicted in FIG. 1, is generally well known and, as broadly embodied herein, may comprise a device similar to that disclosed in U.S. Pat. No. 4,784,251, owned by Applicants' Assignee, the description of which is incorporated by reference herein.

Figure 15A:
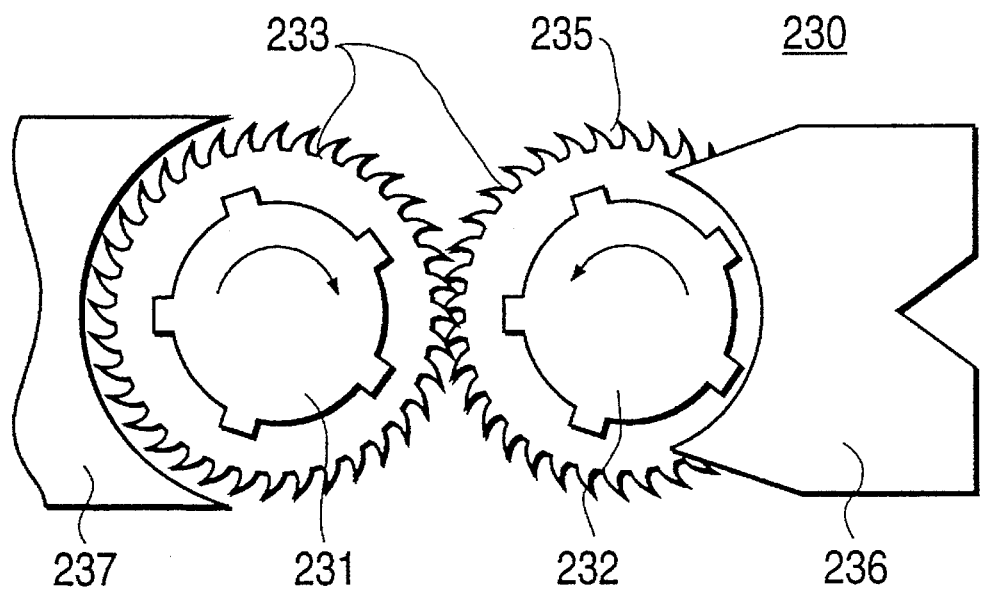
FIG. 15A is a partial side view of an aluminum/PET shredding device for use with the present invention.
Figure 15B:
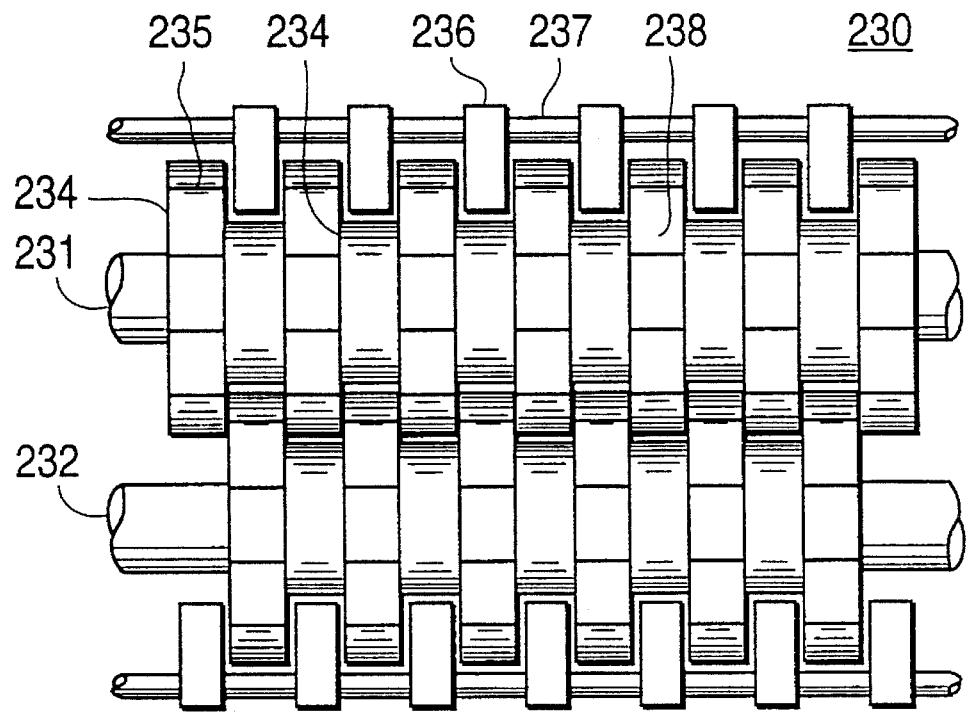
FIG. 15B is a top view of the aluminum/PET shredding device of FIG. 15A.

FIGS. 15A and 15B broadly depict one example of another suitable shredder 230 for shredding aluminum cans and PET bottles. The shredder 230 comprises a pair of counter-rotating shafts 231,232. Mounted on each shaft 231,232 are a plurality of axially-spaced cutting wheels 233, having side edges 234 and peripheral teeth 235. The cutting wheels 233 on each shaft 231,232 are spaced apart from one another by cutter spacers 238 on each shaft so as to be interleaved with the cutting wheels on the opposite shaft, as shown in FIG. 15B. PET bottles and aluminum cans descend into the shredder 230, and are cut into strips between the edges 234 of interleaved wheels 233, while being simultaneously cut into smaller pieces by the teeth 235. Preferably, the shredder 230 also includes a plurality of combers 236, which are cutaway so as not to overlap the respective shaft 231,232, and comber spacers 237, disposed between each pair of wheels 233. The combers 236 direct the bottles and cans between the cutting teeth 235.

The above described shredder 230 is only one embodiment of a shredder for PET bottles and aluminum cans suitable for use with the invention. For example, another embodiment of the shredder 230 includes a stripper having a block with metal fingers that ride against the cutter spacers. Such a shredder is disclosed in U.S. patent application (Serial No. not yet assigned), filed Nov. 12, 1993, owned by Applicants' Assignees, incorporated by reference herein. It will be understood that any shredding device capable of densifying PET bottles or aluminum cans can be used and still fall within the scope of the invention.

The crushing mechanism 112, also generally depicted in FIG. 1, as broadly embodied herein, may comprise the device disclosed in U.S. Pat. No. 4,573,641, owned by Applicants' assignee, the description of which is also incorporated herein by reference. The crushing mechanism 112 densifies commodities of the first group consisting of glass commodities, and generally comprises two rotatable drums 113 which rotate in opposite directions so as to draw glass commodities into the small area between them for crushing. The crushing mechanism 112 may have a plurality of ridges 114 extending outwardly from the drums 113 to facilitate drawing the glass commodities into the area between the drums. The crushing mechanism 112 may also include drive rods 115 disposed above the drums 113 for forcing the glass commodities between the drums. Any suitable means for crushing glass commodities may be provided within the scope of the present invention.

Figure 16A:
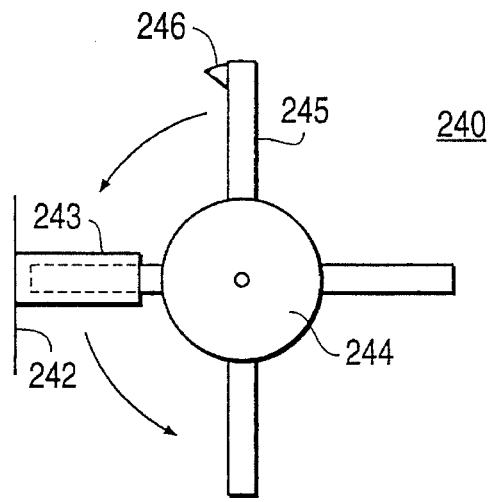
FIG. 16A is a partial side view of a primary glass crushing device according to the present invention.
Figure 16B:
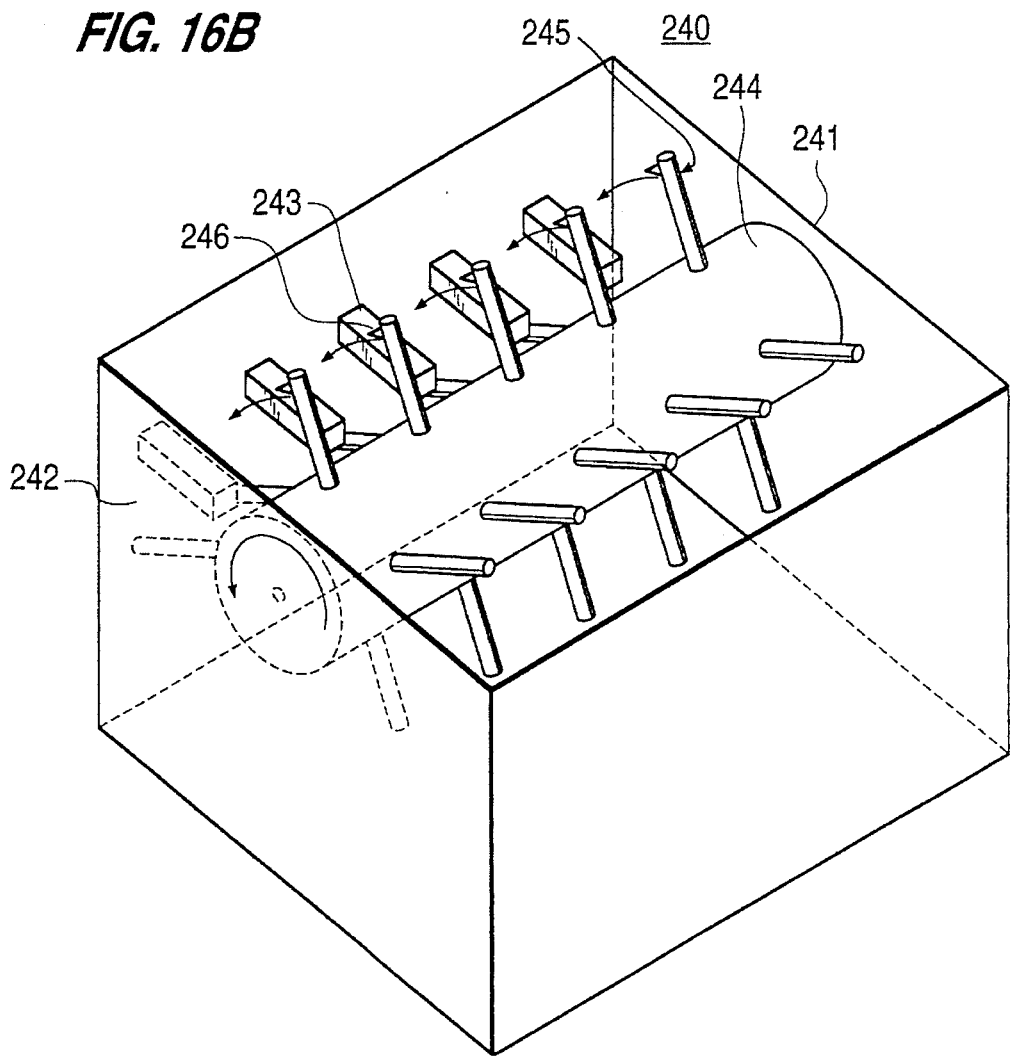
FIG. 16B is a perspective view of the primary glass crushing device of FIG. 16A.

Alternately, the crushing mechanism may include a primary crusher and a secondary crusher, for crushing glass into the smallest possible particles. FIGS. 16A and 16B broadly depict an alternate crushing device 240 which is suitable for use as a primary glass crusher. The primary crusher 240 includes a casing 241, open at top and bottom, defined by side walls 242. A plurality of spaced generally rectangular projecting steel members 243 extend from one side wall 242. A shaft 244 is rotatably mounted parallel to the side wall 242. Projecting from the periphery of the shaft 244 are at least one line of spaced generally cylindrical steel finger members 245. The finger members 245 extend a distance from the shaft 244 such that, as the shaft 244 rotates, the finger members 245 pass between the projecting members 243, without touching the side wall 242. Additionally, the shaft rotates in a direction such that the finger members 245 pass downward and past the projecting members 243, as depicted in FIG. 16A. As can be seen from FIG. 16A, the finger members 245 are interleaved and generally aligned with projecting members 243 as they pass therebetween.

Preferably, certain finger members 245 are configured with carbide tips 246 projecting generally at right angles to the respective finger members 245.

Glass bottles descend into the casing 241 through the open top, and are directed, by the rotation of the shaft 244 and projecting members 245, to the vicinity of the wall 242. The carbide tips 246 place high stress on localized portions of the bottles, where the bottles will generally tend to break more easily. The bottles are then shattered at a variety of locations between the rigid projecting members 243 and the rotating finger members 245. The shaft 241 is driven by a motor (not shown). The effect of the carbide tips 246 placing extremely high stress on very localized points enables the bottle to be fractured using a much smaller horsepower motor than would otherwise be required. The broken glass then passes through the open bottom of casing 241.

Figure 17A:
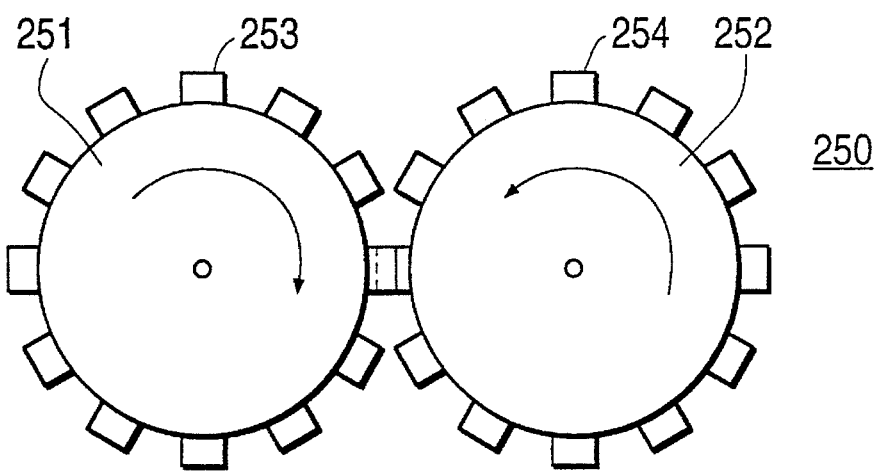
FIG. 17A is a partial side view of a secondary glass crushing device according to the present invention.
Figure 17B:
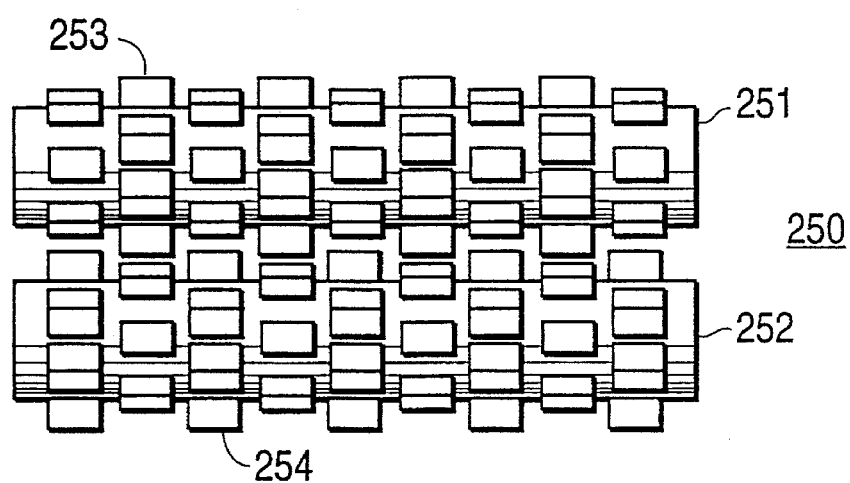
FIG. 17B is a top view of the secondary glass crushing device of FIG. 17A.
Figure 17C:
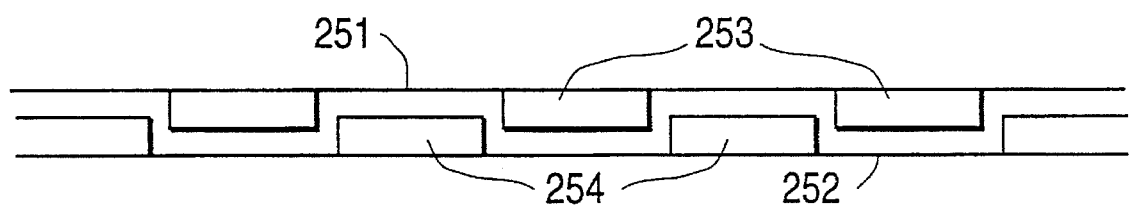
FIG. 17C is a detailed partial view of the secondary glass crushing device of FIG. 17A showing the interaction of the ridges.

Preferably, a secondary glass crusher is provided to further densify the fractured glass pieces into crushed glass particles. FIGS. 17A and 17B depict a suitable secondary glass crusher 250, comprising a pair of counter-rotating steel shafts 251,252, each having a plurality of aligned, spaced steel ridges 253,254 projecting from the periphery of the respective shafts 251,252. The spacing of the ridges 253,254 is arranged such that, as the shafts rotate, each line of ridges 253 on one shaft is aligned and interleaved with the opposing line of ridges 254 on the opposite shaft. This alignment is depicted in FIGS. 17B and 17C. From FIG. 17C, it can be seen that glass pieces descending between the shafts 251, 252 of secondary glass crusher 250 will be further densified into smaller crushed glass particles.

Preferably, each shaft 251,252 has at least twelve (12) rows of the respective ridges 253,254. It has been discovered that a minimum of twelve rows is ideal in order to crush and densify glass sticking to paper labels on domestic beer bottles. With fewer than twelve rows, a problem may occur in which the beer bottle paper label remains intact, with multiple pieces of glass affixed to the adhesive backing. The label and glass are too large to be subsequently removed to storage by pneumatic removal devices. However, it is to be understood that the crusher is not limited to twelve rows. The number of rows may be varied, for example, depending on container and paper label size, in order to prevent labels from remaining intact with glass pieces affixed to the adhesive.

As shown in FIGS. 11 and 12, the storage means 12 preferably includes a segregated storage area for separately storing each predetermined type of densified commodity. In the embodiment illustrated in FIGS. 11 and 12, three storage bins 13, 14 and 15 are connected to the housing 11 by conduits 126. In the embodiment shown in FIGS. 14A and 14B, six storage bins 300 are provided. Any reasonable number of storage bins can be attached to the housing 11 via conduits depending on the amount of separation and number of densified commodities to be separated.

Figure 10:
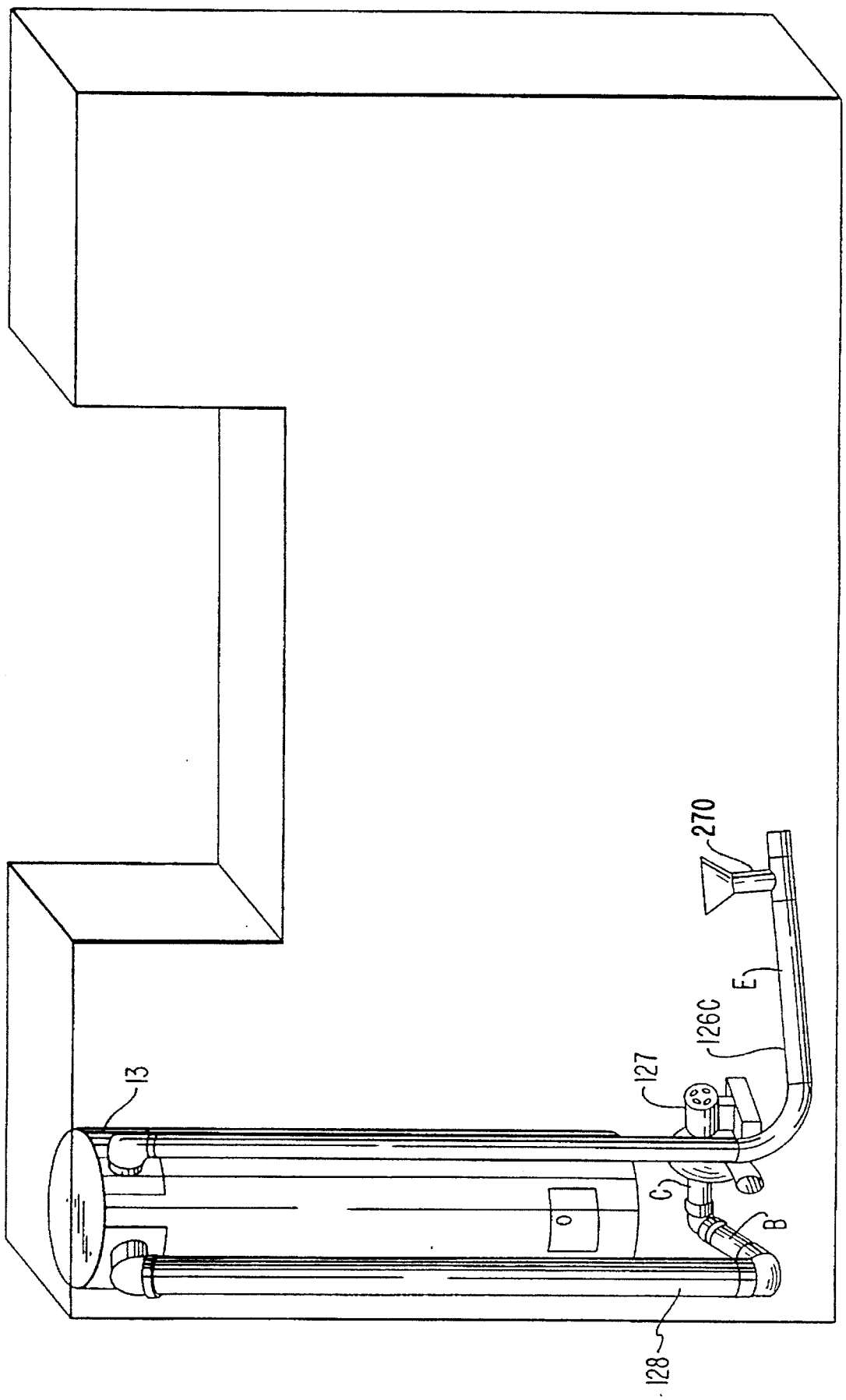
FIG. 10 is a perspective view of the removal means for removing densified cans to the storage means.

In accordance with the invention, removal means is provided for removing the densified commodity from the densification means to the storage means. As shown in FIG. 10, the removal means preferably includes pneumatic means for removing the densified commodity to the storage means. The operation of such pneumatic means is disclosed in U.S. Pat. No. 5,226,519, owned by Applicants' assignee, the description of which is incorporated herein by reference. As broadly embodied herein, and as shown in FIG. 10, the pneumatic removal means for removing aluminum commodities includes an inlet pipe 126 in communication with the storage bin 13. Shredded aluminum commodities are deposited in the inlet pipe 126 through a discharge pipe 270. A blower 127 draws air from the bin 13 through the outlet pipe 128, thereby drawing air and shredded commodities through the inlet pipe 126 into the bin 13.

Each densified commodity is preferably stored in a separate storage bin or compartment, similar to the one described for receiving shredded metal commodities, each being in communication with the housing by one of the inlet pipes 126 and being attached to a blower 127 via an outlet pipe 128. One blower 127 may be operatively connected to a plurality or all of the storage bins, or a separate blower may be provided for each bin. Preferably, one blower 127 is provided for each housing 11 to reduce cost and required space, especially where a plurality of housings are provided in one location. The blower 127 may thus be placed in communication with each of the outlet pipes 128, and is placed in communication with the pipe corresponding to the commodity just densified responsive to the second sensing means 70.

In accordance with the invention, densified material distribution means is provided for distributing densified material from a first group of commodities into a first path, and for distributing densified material from a second group of commodities into a second path. The sensor means senses a feature of the commodity and determines whether the commodity belongs to a first group of commodities or a second group of commodities according to the sensed feature of the commodity.

As broadly embodied in FIGS. 18–22, the densified material distribution means includes a movable member mounted beneath the densification means, a collection member mounted on the movable member and having an inlet and outlet, the collection member collecting the densified material from the densification means at the inlet and distributing the densified material at the outlet.

Referring to FIGS. 18, 19A, and 20–22, as broadly embodied herein, distribution means includes a distribution device 260 mounted in housing 11 beneath the shredder 111 or 230 and the crusher 110 or 240. The distribution device 260 includes a rigid frame 261 having an opening 262 in its center. A base member 263 is secured to the frame 261. A movable member which may comprise a plate 264 is rotatably mounted on the base member 263 via an axle 265. A collection member which may comprise a funnel 266, having a broad inlet 267 facing the densification devices 230, 240 which tapers to an outlet 268, is mounted on the rotatable plate 264. A hole 271 extends through the rotatable plate 264 beneath the funnel 266 and in communication with the outlet 268.

A plurality of apertures 269 are provided through the base member 263, each in communication with a discharge pipe 270. The discharge pipes 270 preferably comprise metallic pipes, or any other study material which will not be damaged by carrying shredded or crushed materials. The centers of the apertures 269 are located in the base member 263 along a circle, the center of which is coaxial with the longitudinal axis of the axle 265. As broadly embodied in FIGS. 18, 19A, and 20, three such apertures 269 are provided. As will be described below, the base member 263 can be configured with any selected number of apertures 269, corresponding to the selected number of separate storage locations for segregated groups of densified material.

Preferably, the base member 263 has multiple apertures 269. For example, three apertures 269 may be spaced at intervals 90° apart, with a standby position 284 spaced 90° from two of the apertures. When the distribution device 260 is not in use, the plate 264 is moved so that the outlet 268 is disposed over the standby position 284 rather than an aperture 269. Positioning the outlet 268 over the standby position 284 when the distribution device 260 is not in use helps maintain vacuum in the discharge pipes 270, as will be described below, and prevents accidental transfer of foreign objects which may enter the funnel 266 when the machine is not operating to a storage bin 300, thereby contaminating the collected material. Closed portions 276 are disposed between the apertures 269 and standby position 284 so that when the plate 264 is rotated and the funnel outlet 268 moves over the base member 263 between the apertures 269, the outlet is effectively closed and is not subject to vacuum.

The funnel inlet 267 should be large enough to catch falling densified material from either one or both of the shredder 230 and crusher 240, as will be described below, no matter what the position the plate 264 relative to the base member 263. Thus, the inlet 267 may be circular and may have a circumference about equal to that of the plate 264. Since the apertures 269 are spaced from the axle 265 about the plate 264, the funnel 266 is skewed so that the outlet 268 passes over the apertures. Thus, the center of the inlet 267 and the center of the outlet 268 are spaced from each other.

In accordance with the invention, drive means is provided, responsive to the sensing means, for driving the movable member to a first predetermined position to distribute the densified material into the first path, and for driving the movable member to a second predetermined position to distribute the densified material into the second path. As broadly shown in FIGS. 18, 19A, and 20–21, means for driving the plate 264 may include a motor 272 secured to the base member 263. The motor 272, which preferably comprises a split phase AC motor, is drivingly engaged with the plate 264 so that the motor 272 may rotate the plate either clockwise or counterclockwise. Preferably, the motor 272 drives a gear 273 having teeth 274 engaged with teeth 275 located around the outside periphery of the plate 264, as shown best in FIG. 20. However, the motor 272 may drive the plate 264 via any suitable connection device, such as a chain and sprocket, a belt, direct frictional contact, or the like.

Figure 18:
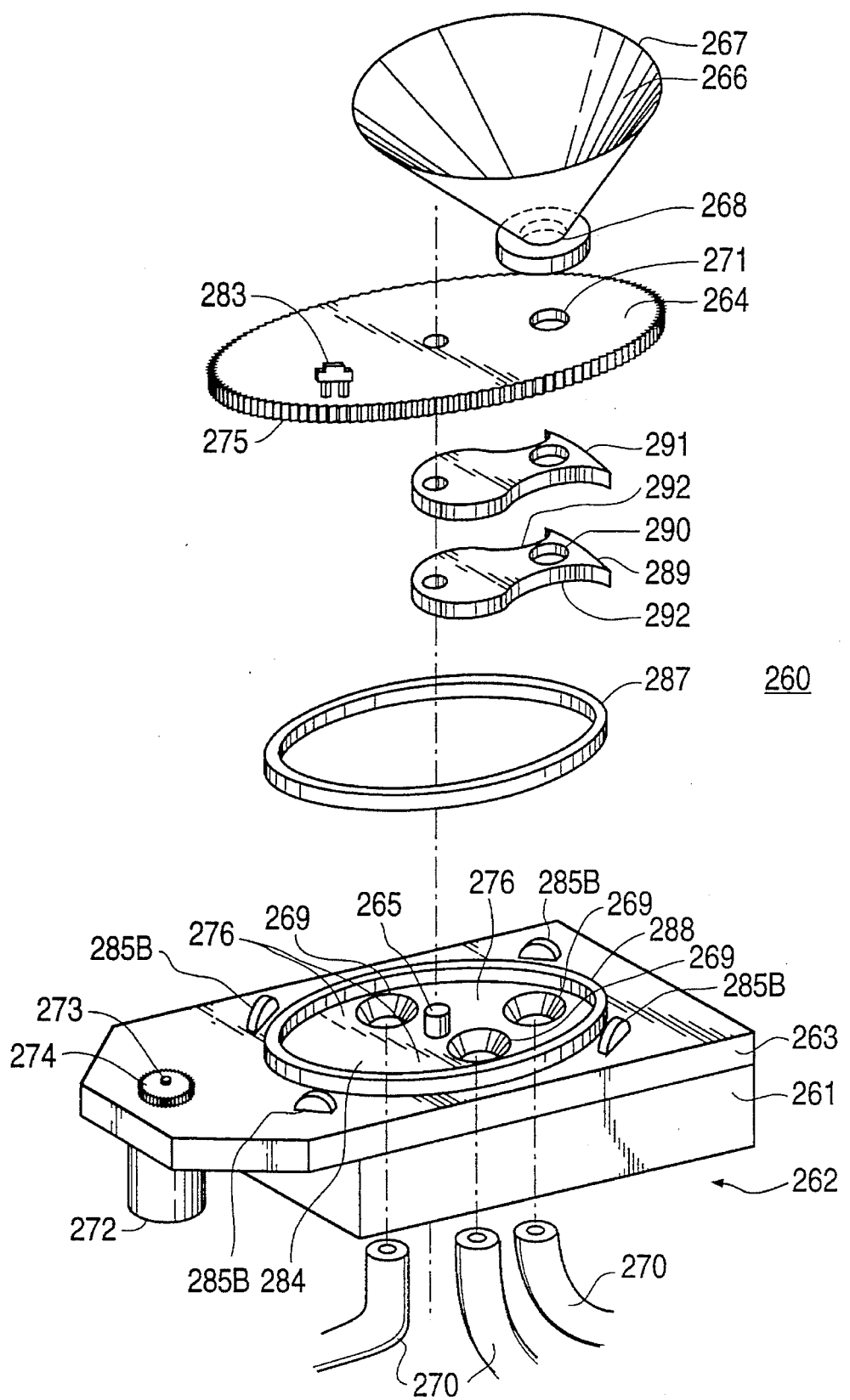
FIG. 18 is a perspective partially exploded view of a densified material distribution device according to the present invention.
Figure 19A:
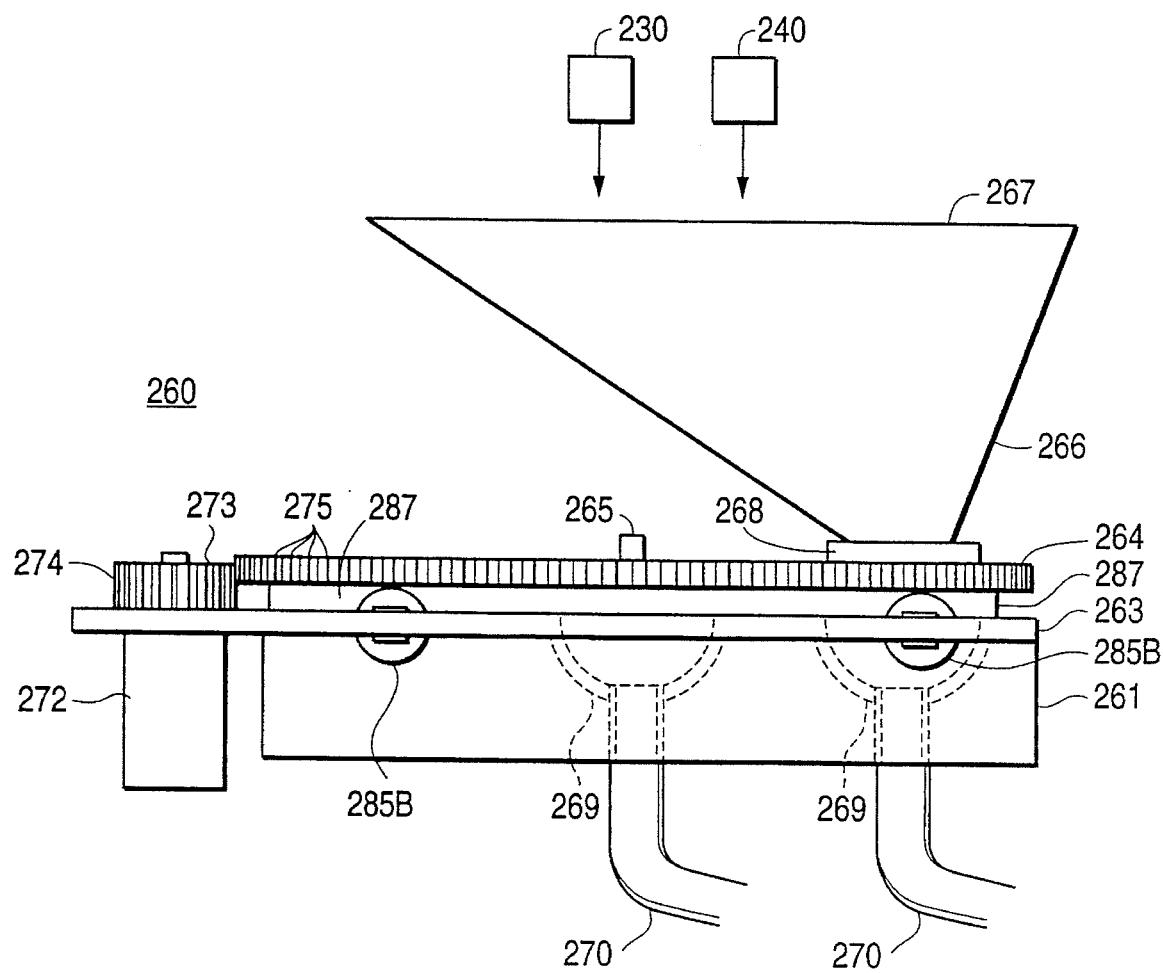
FIG. 19A is a side view of the densified material distribution device of FIG. 18.
Figure 20:
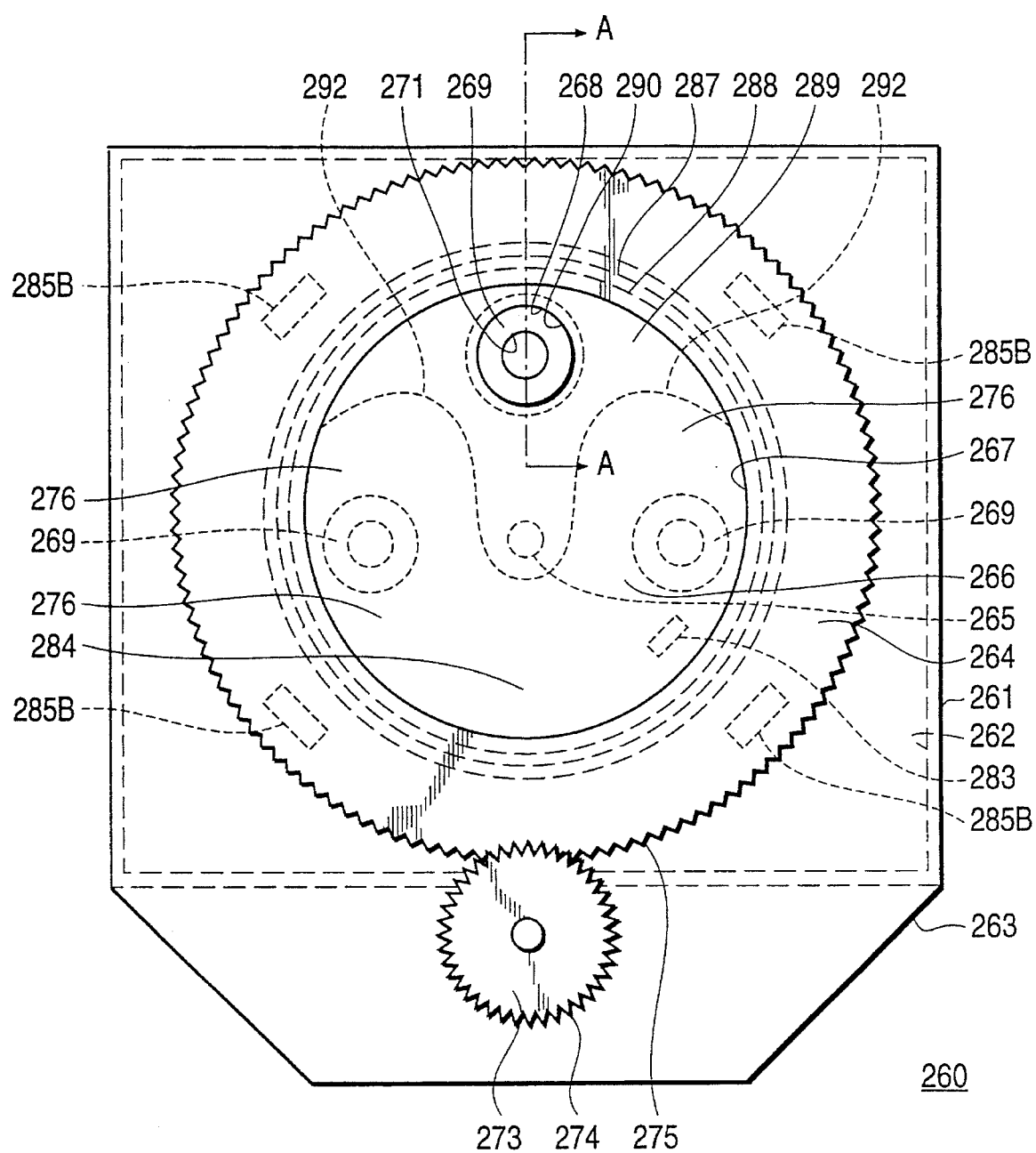
FIG. 20 is a top view of the densified material distribution device of FIG. 18.
Figure 21:
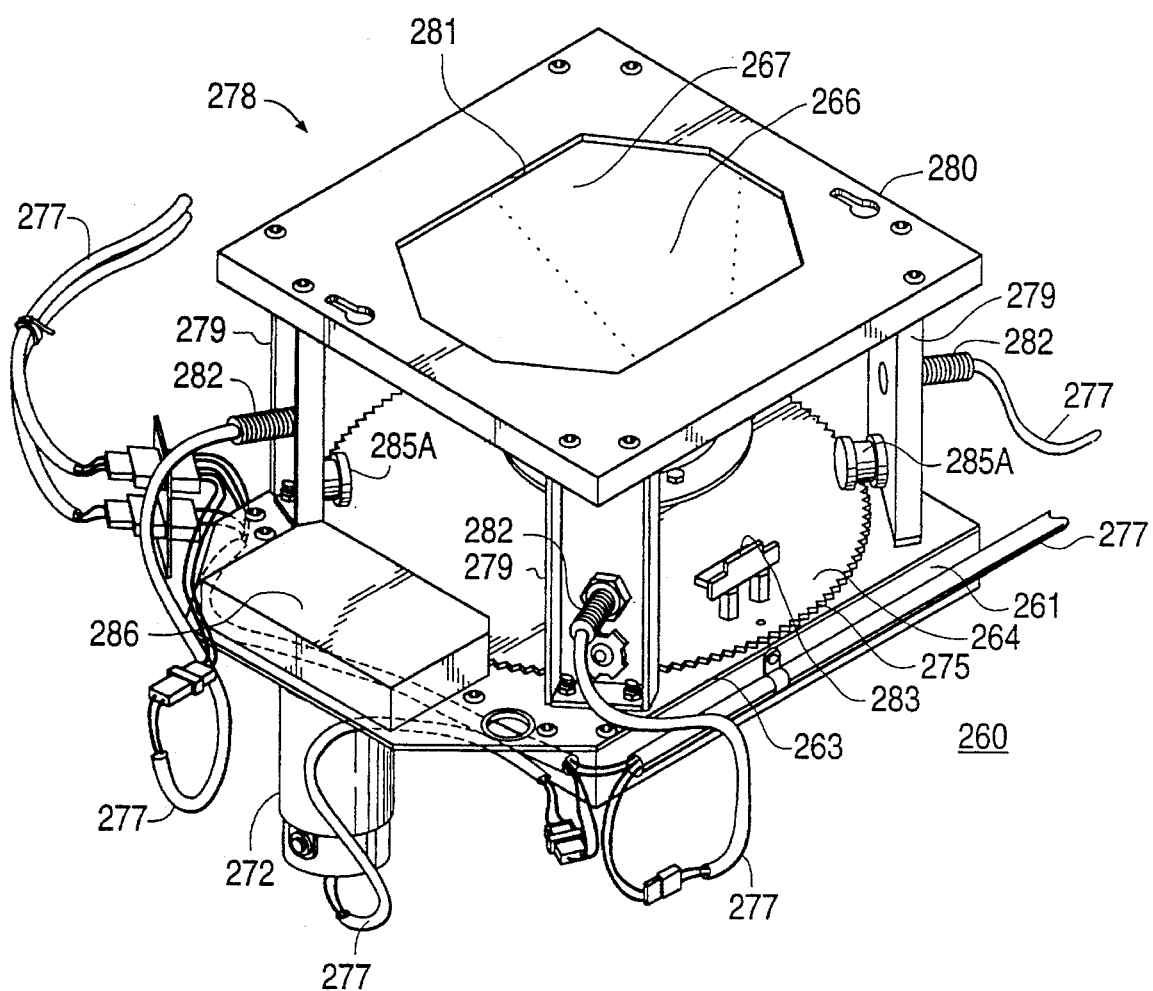
FIG. 21 is a perspective view of the densified material distribution device of FIG. 18 with the upper portion of the frame attached.

As shown in FIGS. 19A and 20, rotation of the plate 264 about the axle 265 causes the hole 271, and therefore the outlet 268 of the funnel 266, to pass over the apertures 269. Rotation of the plate 264 causes the plate to pass through at least two predetermined positions. The plate 264 is in a given predetermined position when the hole 271 and outlet 268 are disposed over a given aperture 269. Therefore, as shown in FIGS. 18, 19A, and 20, when three apertures 269 are provided, the plate 264 is disposed in a first, second, or third predetermined position when the hole 271 is over a given aperture 269, each in communication with a separate discharge pipe 270. Thus, in each predetermined position, the funnel 266 distributes densified materials into one of a plurality of separate paths, that is, into one of the discharge pipes 270.

Figure 19B:
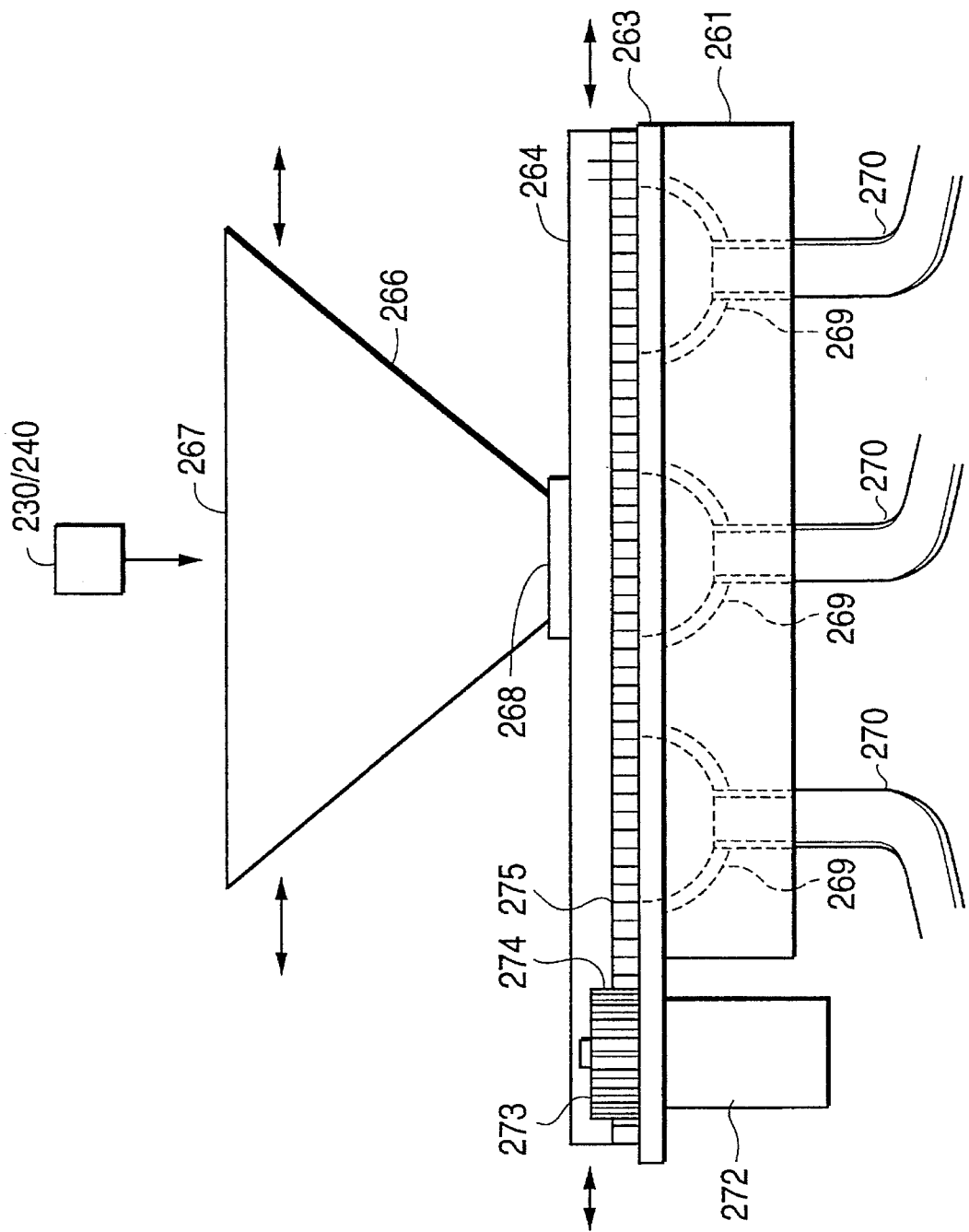
FIG. 19B is a side view of alternate embodiment of the densified material distribution device of FIG. 18 in which the movable member moves linearly rather than rotationally.

An alternate embodiment of the movable member is shown in FIG. 19B. In this embodiment, the movable member comprises a plate 264 mounted on the base member 263 so that the plate may translate back and forth, rather than rotate. The operation of the distribution means is essentially similar to that described above, except that the motor 272 drives the plate 264 back and forth to place the outlet 268 over various apertures 269 and thus in connection with the discharge pipes 270. Preferably, the motor 272 drives gear 273 which has teeth 274 engaging a linear rack of teeth 275 on the plate 264 to move the plate. However, within the scope of the invention, any suitable mechanism may be used to move the plate 264 back and forth.

Whether the movable member of FIG. 19A or 19B is used, each piece of discharge piping 270 is preferably connected via an inlet pipe 126 to a segregated storage bin 300. As very broadly depicted in FIGS. 14A and 14B, a number of separate storage bins 300 are provided. The number of storage bins 300, like the number of apertures 269 in the base member 263, is optional. The number of each can be selected according to the level of segregated storage required. For example, FIGS. 14A and 14B depict six separate storage bins 300, one each for segregated storage of aluminum, clear PET, colored PET, clear glass, green glass, and brown glass.

Figure 14A:
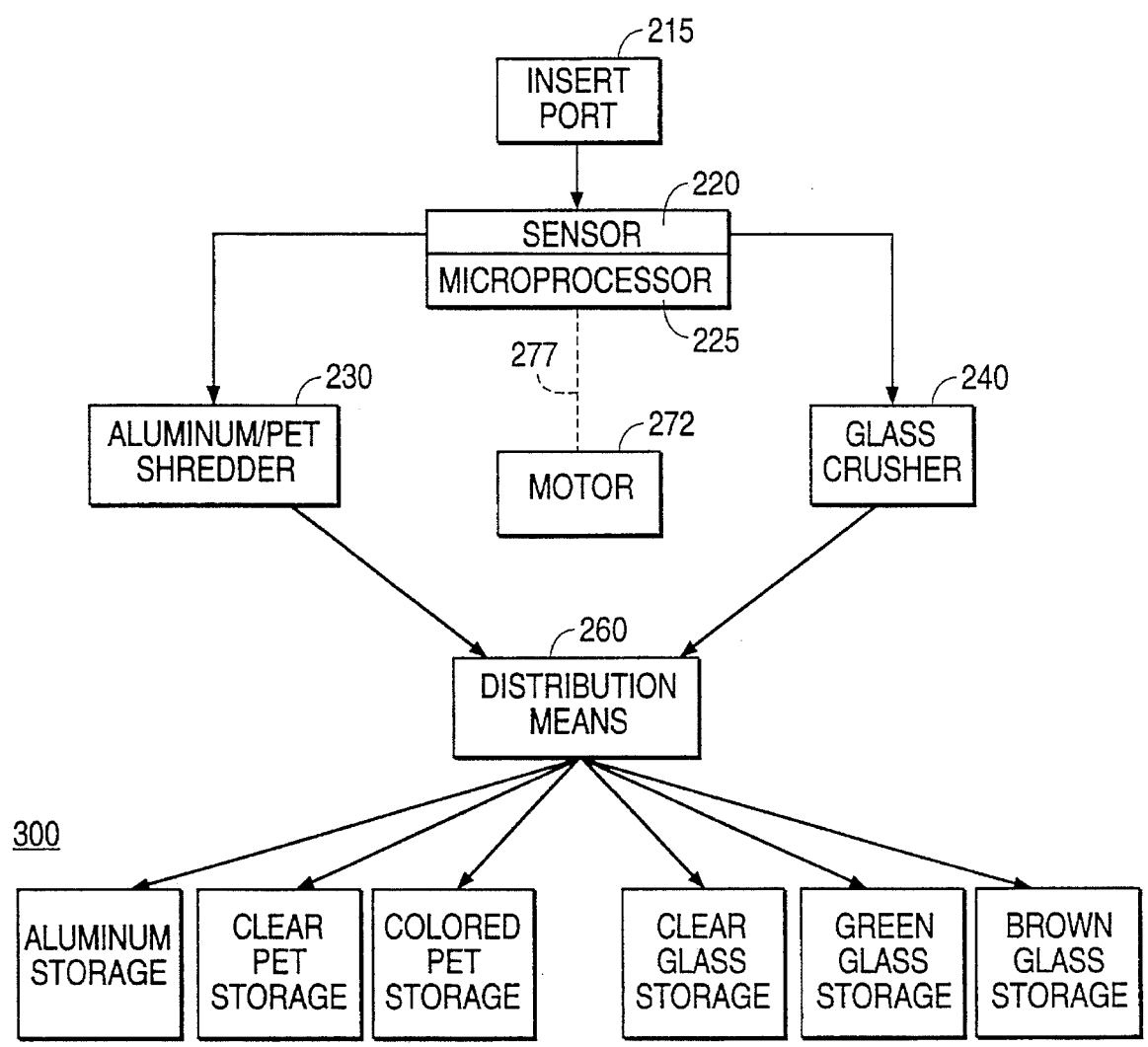
FIG. 14A is a representative schematic view depicting operations of a commodity densification and distribution assembly having a single distribution device in accordance with the present invention.
Figure 14B:
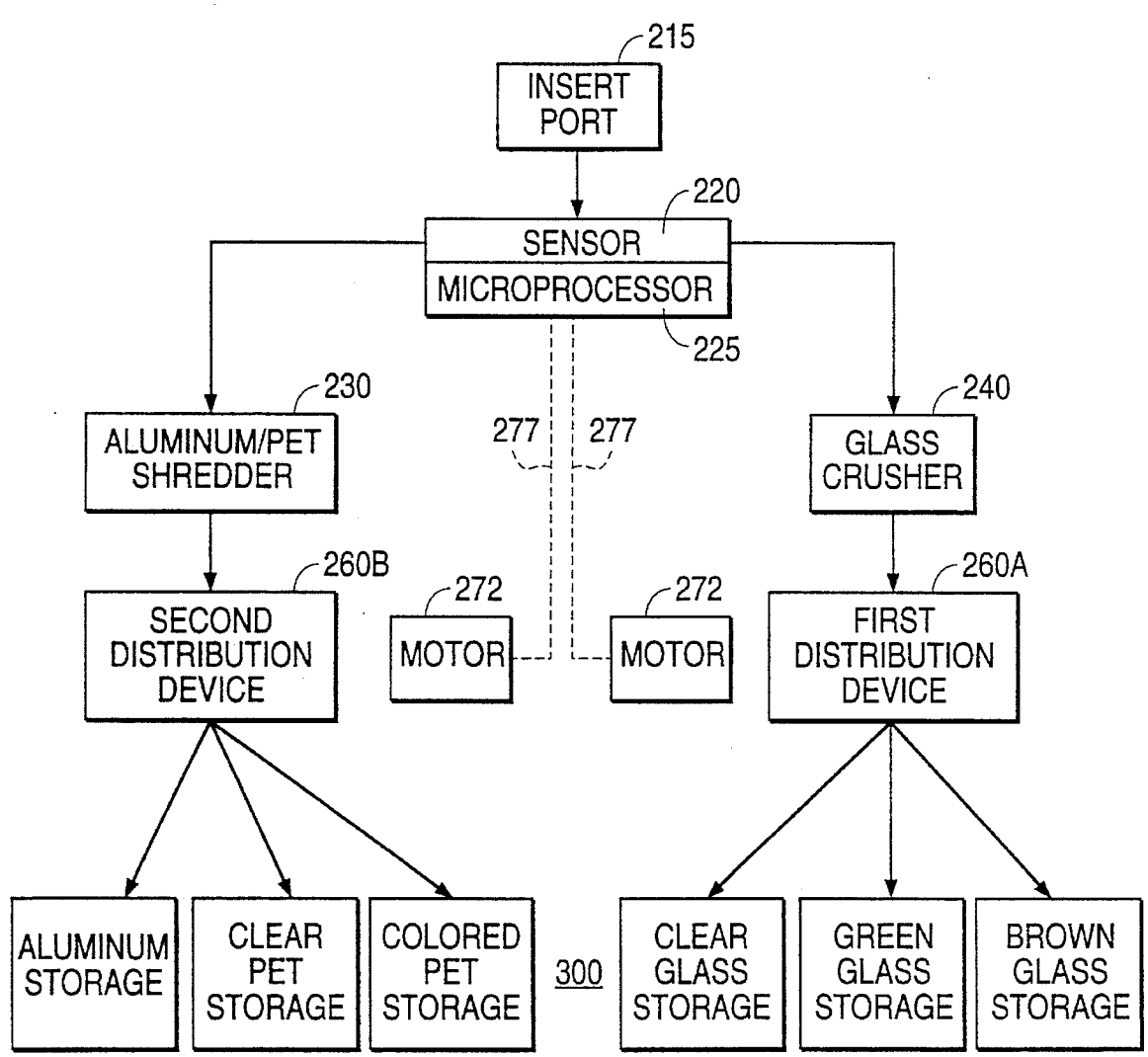
FIG. 14B is a representative schematic view depicting operations of a commodity densification and distribution assembly having two distribution devices in accordance with the present invention.

In the assembly depicted in FIG. 14A, commodities are inserted into the housing 11 via insert port 215 and sensed by the sensor 220. The sensor 220 may comprise the second sensor device 70, described above. The microprocessor 225 stores the information obtained by the sensor 220, including the determination of whether the container belongs to a first or second group of commodities.

The first and second group of commodities can be defined in various ways. For example, the first group may include aluminum and plastic containers and the second group may contain glass containers. Thus, the first and second groups of commodities could be separated from each other either prior to or after densification.

Alternately, the first and second group of commodities may comprise smaller, more discrete groups. For example, the first group could comprise green glass containers and the second group could comprise clear glass containers. Again, these groups could be separated prior to or after densification.

However, the first and second groups are defined, and whenever they are separated from each other, the definition and separation are directed by the microprocessor 225 pursuant to information obtained by the sensor 220. Therefore, any information obtained by sensor 220 (as described above regarding second sensor device 70) may be used to define and separate containers and their resultant densified materials.

In the assembly depicted in FIG. 14A, commodities are separated into first and second groups before entering the crusher 240 and shredder 230, respectively. The first and second densified materials exiting the crusher 240 and shredder 230 respectively pass through a single distribution device 260. The funnel 266 of the distribution device 260 is movable to one of a plurality of predetermined positions (six being depicted in FIG. 14A), at each of which the outlet 268 aligns with an aperture 269 in the base member 263. Six corresponding apertures 269 are thus required in the base member 263 of the distribution device 260. The first densified material is distributed to one of a plurality of first paths (according to the information obtained by the sensor 220) to either the clear glass bin, green glass bin, or brown glass bin. Likewise, the second densified material is distributed to one of a plurality of second paths to the aluminum bin, clear PET bin, or colored PET bin. If a smaller degree of segregation is desired, e.g. aluminum, glass (all colors), and PET (all colors), only three storage bins 300 and three apertures 269 would be required in the device of FIG. 14A.

Alternately, as shown in FIGS. 14B, a first distribution device 260A and a second distribution device 260B may be employed to distribute densified material. In this arrangement, commodities within the first group, as determined by the sensor 220, are routed to the crusher 240 and to the first distribution device 260A. The first distribution device 260A then distributes the first densified material to the corresponding storage bin 300, responsive to the information obtained by the sensor 220, as described above. Similarly, commodities within the second group, as determined by the sensor 220, are routed to the shredder 230 and the second distribution device 260B. The second distribution device 260B distributes the second densified material to the corresponding storage bin 300, responsive to the information obtained by the sensor 220, as above. Thus, in the device of FIG. 14B, each base member 263 of each distribution device 260A, 260B requires only as many as three apertures 269, rather than as many as six, as in the device of FIG. 14A. However, as stated above, the exact number of apertures 269 may vary depending on the degree of separation desired.

Using two distribution devices 260A, 260B provides better separation and less opportunity for inadvertent mixing of different densified materials. Also, use of two distribution devices 260A, 260B allows for more rapid and precise control and movement of the placement of the funnels 266 due to the reduction in scale or each device 260A, 260B made possible by the connection of only three storage bins 300 to each distribution device.

Alternately, a single densification means 230 or 240 and a single distribution device 260A or 260B may be provided in a given housing 11. Such an arrangement allows for the use of a smaller housing 11 in locations where use of a larger housing would not be possible.

In accordance with the invention, selection means may be provided to select the direction the movable member will be driven. In the embodiment broadly disclosed herein, the microprocessor 225 functions as a selection means. Preferably, the microprocessor 225 keeps track of the current position of the plate 264, in order to signal the motor 272 as to the proper direction to turn which will provide the shortest distance of rotation or translation for the plate 264 to align the funnel 266 with the proper aperture 269. This operation of the microprocessor 225 provides for quicker operation of the overall assembly.

As broadly depicted in FIGS. 14A, 14B, 18, 19A, and 21, the motor 272 is electrically connected to the sensor 220, and receives signals from the microprocessor 225 via wiring 277. The received signals, which as discussed earlier indicate the type of material and/or color of the material passing by the sensor 220, cause the microprocessor 225 to instruct the motor 272 to turn in the desired direction. For example, if the sensor 220 determines that a commodity is made of aluminum, the plate 264 is moved such that the funnel outlet 268 communicates with an aperture 269 connected via discharge piping 270 to the aluminum storage bin 300. The sensor 220 may determine that the next commodity inserted is made of green glass. The microprocessor 225 will then send a green glass signal to the motor 272. The motor 272 will turn in the required direction to move the plate 264 to align the funnel outlet 268 with the proper aperture 269, communicating with green glass storage bin 300.

Preferably, the distribution means includes a position sensor for determining the position of the plate. As broadly shown in FIG. 21, distribution device 260 includes an upper frame 278 mounted on the base member 263, and includes arms 279 supporting top plate 280. The distribution device 260 may be mounted in the housing 11 of the commodity densification and distribution assembly via the arms 279 and top plate 280, if desired. A hole 281 extends through the top plate 280 to allow densified material to pass into the funnel 266. A position sensor 282 is mounted on each arm 279 for detecting the presence of a trigger plate 283 mounted on the plate 264. The trigger plate 283 is mounted on the rotatable plate 264 in a predetermined position so that, when the plate 264 has rotated to a position such that the trigger plate 283 is in front of a position sensor 282 and is sensed thereby, the outlet 268 of the funnel 266 is disposed over one of the apertures 269 or over the standby position 284. In order to effectively track the funnel outlet 268 position, the number of position sensors 282 provided is therefore one greater than the number of apertures 269, to account for the standby position 284, and may vary according to the amount of material separation desired, as described above. The position sensors 282 are electrically connected to the motor 272 and microprocessor 225 via wiring 277.

Preferably, wheels 285A are mounted to the arms 279 so as to contact the plate 264 from above as it rotates to stabilize its rotation. Wheels 285B are also mounted to the base member 263 to contact the plate 264 from below to further stabilize the plate (see FIGS. 18, 19A, and 20). A cover 286 may be provided over the gear 273 to keep foreign objects from inadvertently passing between its teeth 274 and the teeth 275 of the plate 264.

The position sensors 282 and trigger plate 283 operate in conjunction with the sensor 220, the motor 272, and the microprocessor 225 to properly position the funnel outlet 268. For example, if the sensor 220 determines that an inserted commodity is an aluminum can, the motor 272 drives the plate 264 the shortest distance (clockwise or counterclockwise) that will place the outlet 268 over the aperture 269 connected to the aluminum storage bin 300. When the trigger plate 283 reaches position sensor 282 corresponding to the respective aperture 269, the motor 272 stops. The can is shredded by the shredder 230 and passes into the funnel 266 of the distribution device 260. Suction in the respective aperture 269 caused by the blower 127 helps draw the shredded material out of the funnel 266 and into the aluminum storage bin 300. This process is repeated for each specific commodity inserted, with the microprocessor 225 keeping track of the position of the plate 264 so that it may be rotated the shortest distance to the desired location. If a predetermined time passes after a commodity has been inserted without another commodity being inserted, the motor 272 drives the plate 264 to locate the outlet 268 over the standby position 284. Such sensors 282 and the accompanying control elements may also be employed with the translational device shown in FIG. 19B.

Preferably, a pneumatic device is provided for drawing the densified materials through the respective apertures. As broadly embodied herein, the pneumatic device may be the blower 127, described above, connected to each of the discharge pipes 270, and thereby to each of the apertures 269. The blower is turned on by the microprocessor 225 and vacuum is drawn on all of the discharge pipes 270 once a consumer inserts a container into the housing 11. The vacuum is maintained until the plate 264 returns the outlet 268 to the standby position 284 after the consumer stops placing containers into the housing 11.

Preferably, means is provided for maintaining vacuum within the discharge pipes. As broadly embodied in FIGS. 18, 19A, 20 and 22, a seal member such as a rubber or plastic strip 287 is mounted on the base member 263 about the apertures 269. A raised ridge 288 may be disposed about the apertures 269 on the base member 263 to support the strip 287 and serve as a barrier for material getting between the base member and the plate 264. The strip 287 contacts the bottom surface of the plate 264 to reduce vacuum losses in the discharge pipes 270 due to air flow traveling from outside of the distribution drive 260, between the plate 264 and the base member 263, and into the discharge pipes 270. Since the strip 287 minimizes inward air flow between the plate 264 and base member 263, the suction from a given discharge pipe 270 beneath the outlet 268 more effectively draws densified material from the outlet into the discharge pipe. As the strip 287 may wear due to friction with the plate 264, it may be replaced periodically to optimize performance of the distribution device 260.

Figure 22:
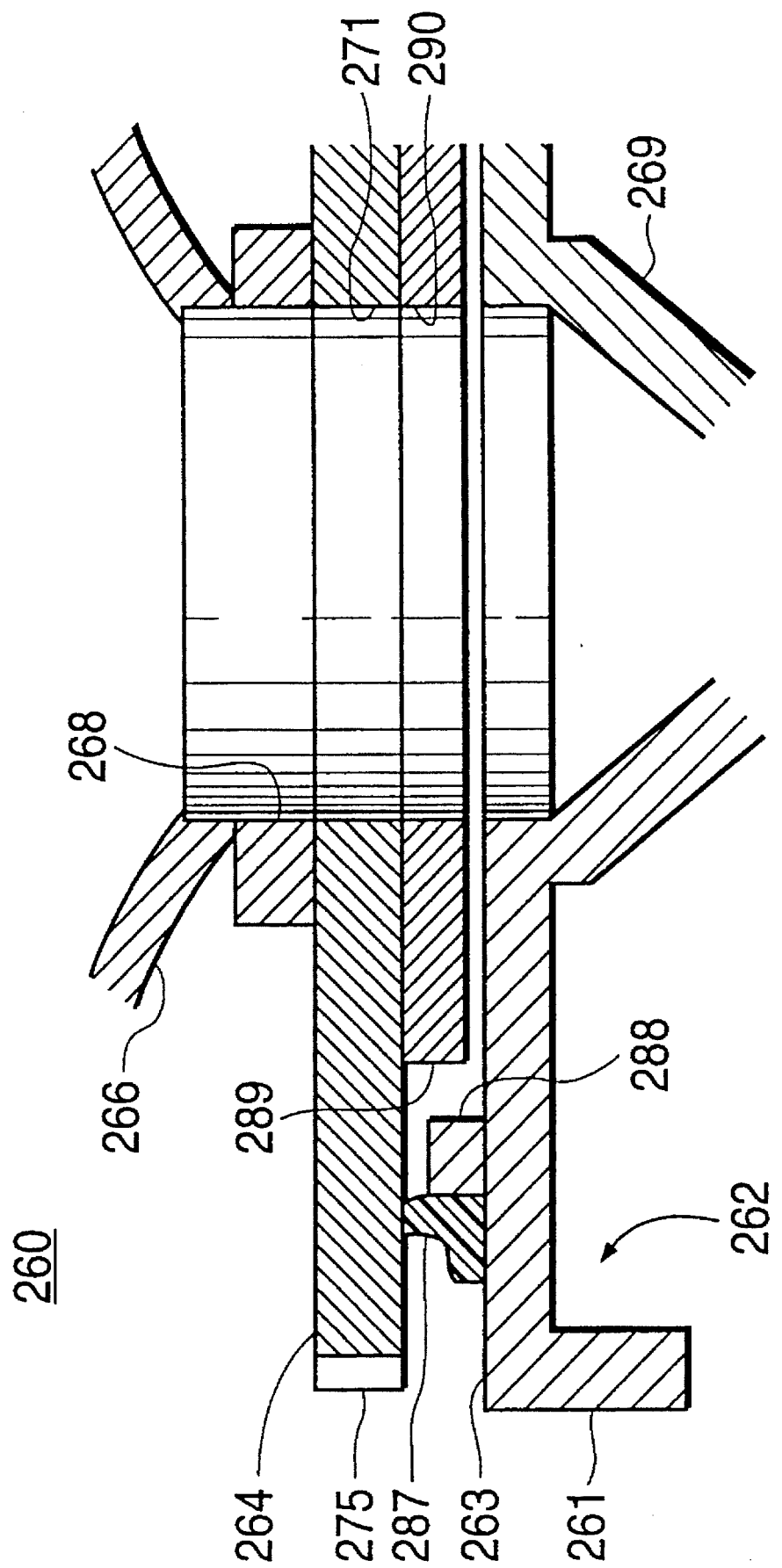
FIG. 22 is a partial sectional view of the densified material distribution device of FIG. 18 taken along line A—A in FIG. 20.

As shown in FIGS. 18, 20, and 22, a sweeper plate 289 may be mounted on the bottom of the plate 264 opposite the base member 263 and surrounding the hole 271 and outlet 268. The sweeper plate 289 defines a hole 290 therethrough in communication with the hole 271 and the outlet 268 for directing densified materials to the respective aperture 269. The bottom of the sweeper plate 289 should be near, but should not touch, the base member 263 in order to preclude wear due to friction. Preferably, the thickness of the sweeper plate 289 is such that its bottom is spaced from the top of the base member 263 by about 0.010 to 0.020 inches. If desired, a spacer 291 (see FIG. 18) may be inserted between the plate 264 and sweeper plate 289 to achieve the desired offset.

The purpose of this sweeper plate 289 is threefold. First, the sweeper plate 289, by virtue of its close clearance with the base member 263, directs densified materials from the outlet 268 through the hole 290 to the desired aperture 269, preventing the material particles from falling onto the top of the base member. Second, the sweeper plate 289 reduces the suction effect of the vacuum on the densified material particles from apertures 269 not beneath the outlet 268 to prevent the densified material from being drawn into the wrong aperture. Third, the sweeper plate 289 pushes any minimal amount of densified materials which do fall onto the top of the base member 263, and which are larger than the offset between the sweeper plate and base member, into an aperture 269 (e.g., those particles which initially land in the funnel 260 after densification, but only fall out of the funnel when the outlet 268 is above a closed position 276 or the standby position 284). The curved edges 292 of the sweeper plate 289 help the sweeper plate push any large enough densified material particles on the base member 263 into an aperture 269 as the plate 264 moves.

Figure 13:
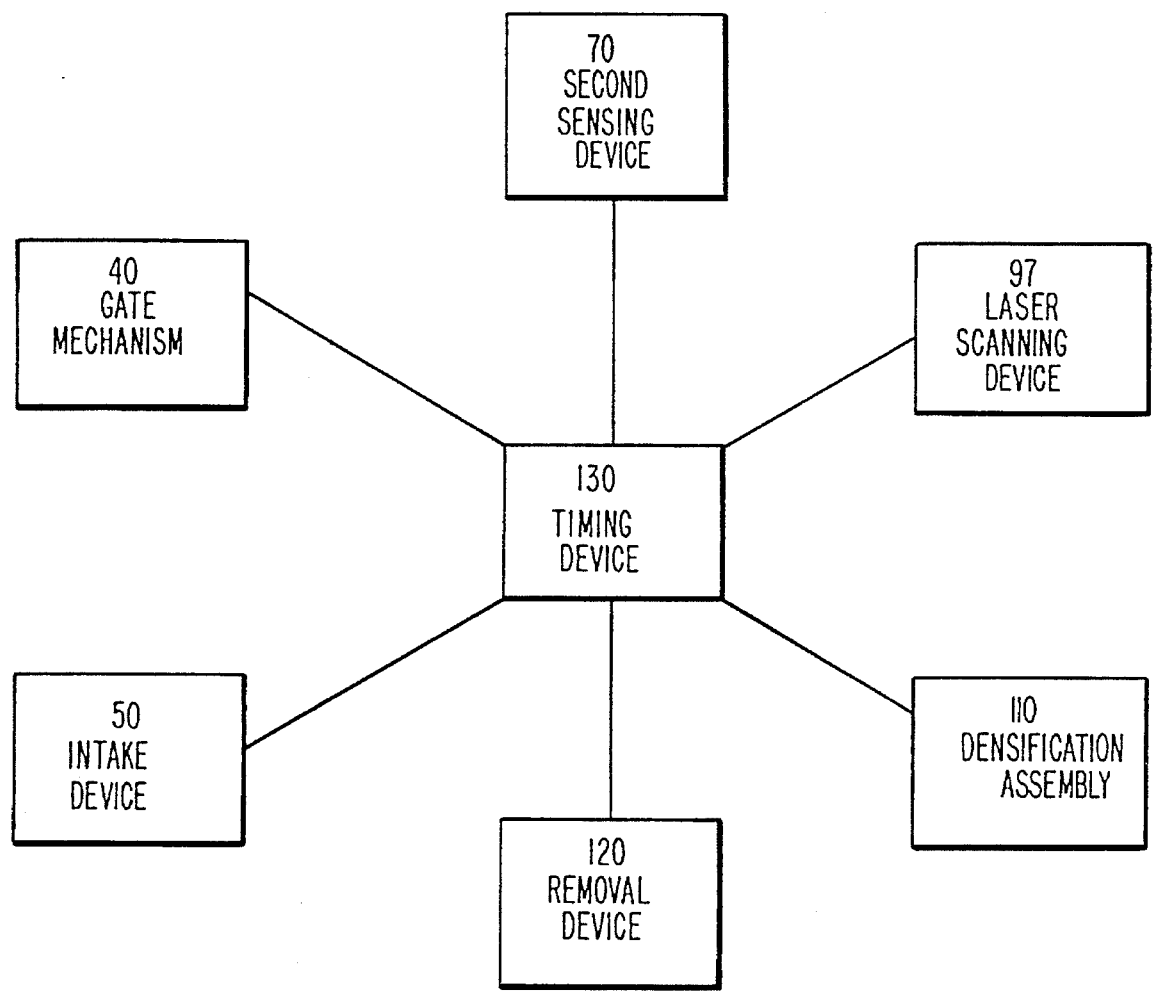
FIG. 13 is a block diagram generally depicting the timing means of the commodity collection, densification and storage assembly and its operational connection to the intake means, gate means, second sensor means, densification means and removal means.

In accordance with the invention, timing means is provided for coordinating a sequential operation of the intake means, gate means, second sensor means, densification means and removal means so that the assembly may receive a plurality of various commodities while maintaining the separation of each type of inserted commodity. As broadly depicted in FIG. 13, the timing means comprises a timing device 130 including a microprocessor operatively connected to the intake device 50, gate mechanism 40, second sensing and laser scanning devices 70, 97, densification assembly 110 and removal device 120. Further, the microprocessor which comprises the timing device 130 may also control the second sensing device 70 above.

Since an object of the present invention is to allow rapid recycling of a number of types of commodities in succession, the timing device 130 controls the sequential activation of the above portions of the assembly to achieve a minimum preferred processing speed of 45 cans per minute, 14 glass bottles per minute, and 6 plastic bottles per minute. The maximum preferred amount of transition time required for the timing device 130 to adjust the assembly to process commodities of different compositions is 3 seconds.

The timing device 130 initiates the action of the intake device 50 to draw in a second commodity at a variable time after the drawing in of a first commodity based on the information obtained by the second sensor device 70 regarding the first inserted commodity. Each of the compositions of commodities take different amounts of time to be processed by the assembly due to their inherent differences in size, weight, shape, etc. The timing device 130 ensures that an inserted commodity has passed into the densification assembly 110 before the next commodity is drawn into the housing by the intake device 50.

Timing device 130 enables the assembly to operate quickly, while maintaining proper segregation of densified commodities. Thus, the use of the timing device allows the commodity collection, densification and storage assembly to simultaneously process several commodities thereby saving time for the consumer.

Preferably, payment means is provided for determining the number of commodities inserted and issuing at least one token in response. As broadly embodied herein, payment means comprises a payment assembly 140 including a microprocessor 225 for counting the number of commodities inserted and calculating the value of the token to be issued to the consumer. The token may comprise a redeemable voucher, receipt or coin. The microprocessor may be the same one utilized for the timing device 130, above.

In order to reduce the need for maintaining a supply of coins or currency, it is preferred that a printer be utilized for printing and issuing redeemable receipts or vouchers in response to the commodities received. These receipts or vouchers may have barcodes and can be later exchanged for merchandise or cash, thereby eliminating the need for storing currency or coins in the machine. Printing mechanisms known in the art such as those made by Atech or Cybertech may be readily incorporated into the assembly.

The timing device 130 may also, pursuant to signals received from shut-off sensors (not shown), either partially or totally prevent the assembly from accepting recyclable commodities. For example, if a storage bin 13, 14, 15, or bin 300 were full or an inlet pipe 126 were blocked, the timing device 130 would, pursuant to the information obtained by the second sensor device 70, refuse to accept any more of the corresponding type of recyclable commodity. The inserted commodity would be returned to the consumer through the reject port 32 as if it were a nonrecyclable commodity or a nonparticipating commodity.

The operation of the assembly will now be described. The consumer begins by approaching the housing 11 with various commodities to be inserted. The consumer then inserts the first commodity into the proper insert port 30, 31, or port 215 of the housing 11. Insertion of the commodity is detected by the infrared sensor device 61, thereby initiating the rotation of the rollers 52, 53 and belt 54 of the intake device 50. The gate mechanism 40 opens, and the inserted commodity is passed through the second sensor device 70 and laser scanning device 97. After the gate mechanism 40 is released from the opened position, the first sensor device 46 will determine whether the plates 41–44 close within milliseconds. If not, the intake device 50 is stopped and the gate mechanism 40 is reopened. When the object is removed from the gate mechanism 40 allowing it to close, the intake device 50 will resume operation.

The second sensor device 70 then senses the color, composition, weight and shape of the inserted commodity. The laser scanning device 97 scans the inserted commodity for a barcode, rotating the commodity if necessary.

The separation wheel 100, responsive to the information about the inserted commodity determined by the second sensor device 70 and laser scanning device 97, routes the inserted commodity accordingly. Nonparticipating commodities, steel cans, and heavy objects are rejected and returned to the consumer via the reject port 32. Plastic and aluminum commodities are sent to the shredding mechanism 111 or 230 for densification, and glass commodities are sent to the crushing mechanism 112 or 240 for densification. The densified commodities then pass down the ramps 116, 117 to the sorter assembly 121 or to a distribution device 260A, 260B. First and second chutes 122, 123 transfer the densified commodities to the proper inlet pipe 126 to send the densified commodity to a storage bin 13, 14, 15 or bin 300, or the distribution device plate 264 moves to direct the densified commodities to a storage bin. The blower 127 is activated thereby transferring the densified commodity to the proper storage bin.

Meanwhile, the consumer may push a button to receive payment for the inserted commodities, either in the form of a voucher, coupon or the like, or he may elect to donate the payment to a selected charity, or the consumer may insert another commodity into the insert port 30, 31, or port 215.

Due to the speed of the present invention in receiving commodities, the above activities of the assembly may often overlap when a plurality of commodities are inserted consecutively. For example, when a second commodity is inserted, the intake device 50 will begin to draw the commodity into the housing 11 once the previously inserted commodity is passed to the densification assembly 110.

The invention is not limited to the embodiments described above. Nor is the distribution device restricted for use in reverse vending machines, but may be incorporated on a larger scale in commodity processing and recycling centers, for example, where various commodities are to be densified and distributed to segregated storage bins according to material of composition and/or color.

Other embodiments of the invention will be apparent to those skilled in the art from consideration of the specification and practice of the invention disclosed herein. It is intended that the specification be considered as exemplary only, with a true scope and spirit being indicated by the following claims.

What is claimed is:

1. A commodity densification and distribution assembly, comprising:

a housing having an insert port for receiving a commodity;

sensor means disposed in the housing for sensing a feature of the commodity, and for determining whether the commodity belongs to a first group of commodities or a second group of commodities according to the sensed feature of the commodity;

densification means disposed in the housing downstream of the sensor means for densifying the commodity into densified material; and densified material distribution means for distributing densified material from the first group of commodities into a first path, and for distributing densified material from the second group of commodities into a second path, the distribution means including a plate rotatably mounted in the housing beneath the densification means, a collection member mounted on the plate and having an inlet and an outlet, the collection member collecting the densified material from the densification means at the inlet and distributing the densified material at the outlet, and drive means, responsive to the sensor means, for driving the plate to a first predetermined position to distribute the densified material into the first path, and for driving the plate to a second predetermined position to distribute the densified material into the second path.

2. A commodity densification and distribution assembly according to claim 1, wherein the sensed feature is a material of composition of the commodity.

3. A commodity densification and distribution assembly according to claim 2, wherein the distribution means distributes the densified material from the second group of commodities into one of a plurality of second storage paths according to the sensed material of composition.

4. A commodity densification and distribution assembly according to claim 2, wherein the sensing means senses that the material of composition is glass.

5. A commodity densification and distribution assembly according to claim 2, wherein the sensor means senses that the material of composition is aluminum.

6. A commodity densification and distribution assembly according to claim 2, wherein the sensor means senses that the material of composition is plastic.

7. A commodity densification and distribution assembly according to claim 1, wherein the sensed feature is a color of the commodity.

8. A commodity densification and distribution assembly according to claim 7, wherein the distribution means distributes the densified material from the first group of commodities into one of a plurality of first storage paths according to the sensed color.

9. A commodity densification and distribution assembly according to claim 7, wherein the distribution means distributes the densified material from the second group of commodities into one of a plurality of second storage paths according to the sensed color.

10. A commodity densification and distribution assembly according to claim 1, wherein the second group of commodities includes commodities composed of aluminum or plastic.

11. A commodity densification and distribution assembly according to claim 10, wherein the densification means includes a shredder which shreds commodities from the second group of commodities.

12. A commodity densification and distribution assembly according to claim 1, wherein the first group of commodities includes commodities composed of glass.

13. A commodity densification and distribution assembly according to claim 12, wherein the densification means includes a crusher which crushes commodities from the first group of commodities.

14. A commodity densification and distribution assembly according to claim 13, wherein the crusher includes a fixed support having a first plurality of spaced, parallel, elongated members extending from the support toward a rotating shaft, the rotating shaft having a second plurality of spaced, parallel, elongated members extending from a peripheral surface of the shaft, and rotatable therewith, each of the second plurality of elongated members passing between two of the first plurality of elongated members upon each rotation of the shaft.

15. A commodity densification and distribution assembly according to claim 14, wherein at least one of the second plurality of elongated members has a hardened tip projecting from the elongated member in a direction generally perpendicular to the extension of the elongated member.

16. A commodity densification and distribution assembly according to claim 15, wherein the hardened tip includes carbide.

17. A commodity densification and distribution assembly according to claim 14, further including a third plurality of spaced, parallel, elongated members extending from the peripheral surface of the shaft opposite the second plurality of elongated members, each of the third plurality of elongated members passing between two of the first plurality of elongated members upon each rotation of the shaft.

18. A commodity densification and distribution assembly according to claim 13, wherein the crusher includes a primary glass crusher and a secondary glass crusher.

19. A commodity densification and distribution assembly according to claim 1, wherein the densification means includes a crusher which crushes commodities from the first group of commodities, and a shredder which shreds commodities from the second group of commodities.

20. A commodity densification and distribution assembly according to claim 1, wherein the drive means includes a motor for rotating the plate.

21. A commodity densification and distribution assembly, comprising:

a housing, including an insert port for receiving a commodity;

sensor means disposed in the housing adjacent the insert port for sensing a feature of the commodity, and for determining whether the commodity belongs to a first group of commodities or a second group of commodities according to the sensed feature of the commodity;

a crusher disposed in the housing which crushes the first group of commodities into first densified material;

a shredder disposed in the housing which shreds the second group of commodities into second densified material;

a first distribution device mounted beneath the crusher for distributing the first densified material into one of a plurality of first paths; and a second distribution device mounted beneath the shredder for distributing the second densified material into one of a plurality of second paths.

22. A commodity densification and distribution assembly according to claim 21, wherein the first distribution device includes a plate movably mounted in the housing beneath the shredder, a funnel secured to the plate, the funnel having an inlet for receiving the first densified material from the crusher and an outlet for distributing the first densified material, and drive means, responsive to the sensor means, for driving the plate to one of a plurality of predetermined positions to distribute the first densified material to a respective one of the first paths; and wherein the second distribution device includes a plate movably mounted in the housing beneath the crusher, a funnel secured to the plate, the funnel having an inlet for receiving the second densified material from the shredder and an outlet for distributing the second densified material, and drive means, responsive to the sensor means, for driving the plate to one of a plurality of predetermined positions to distribute the second densified material to a respective one of the second paths.

23. A commodity collection, densification, and storage assembly, comprising:

a housing having an insert port for receiving a commodity;

sensor means disposed in housing for sensing a feature of the commodity, and for determining whether the commodity belongs to a first group of commodities or a second group of commodities according to the sensed feature of the commodity;

densification means disposed in the housing downstream of the sensor means for densifying the commodity into densified material;

a first storage container for storing densified material from the first group of commodities;

a second storage container for storing densified material from the second group of commodities; and densified material distribution means disposed in the housing for distributing densified material from the first group of commodities into the first storage container, and for distributing densified material from the second group of commodities into the second storage container, the distribution means including a plate rotatably mounted in the housing beneath the densification means, a collection member secured to the plate, the collection member having an inlet for receiving the densified material and an outlet for distributing the densified material, and drive means, responsive to the sensor means, for driving the plate such that either the first storage container or the second storage container is in communication with the collection member outlet.

24. A commodity densification and distribution assembly according to claim 23, wherein the drive means includes a motor for rotating the plate.

25. A material distribution device for distributing a plurality of different materials to a respective plurality of selected storage locations, comprising:

a frame;

a sensor means disposed in the frame for sensing a feature of the different materials;

a movable member mounted on the frame;

a collection member mounted to the movable member and having an inlet for collecting the different materials, and an outlet for distributing the different materials;

drive means mounted to the frame and coupled to the movable member for driving the movable member to one of a plurality of predetermined positions in which the collection member outlet is in communication with a respective storage location for distributing the different materials from the collection member to the respective storage location;

a position indicator mounted for movement with the movable member; and a plurality of position sensors for sensing the position indicator, each of the position sensors being mounted on the frame so that, when a given position sensor senses the position indicator, the movable member is positioned in a corresponding one of the predetermined positions, the drive means driving the movable member responsive to the feature sensed by the sensor means and positioning the movable member responsive to the sensing of the position indicator by the position sensors.

26. A material distribution device according to claim 25, wherein the movable member includes a plate rotatably mounted in the frame, and the drive means includes a motor for rotating the plate.

27. A material distribution device according to claim 26, wherein the motor moves the plate in either one of two directions.

28. A material distribution device according to claim 25, wherein the movable member includes a plate, and the frame includes a base member on which the plate is rotatably mounted, the base member defining a plurality of apertures therethrough, the collection member outlet communicating with a respective aperture when the plate is at a given predetermined position.

29. A material distribution device according to claim 28, wherein the sensed feature is a material of composition of the material.

30. A material distribution device according to claim 28, wherein the sensed feature is a color of the material.

31. A material distribution device according to claim 28, further including a pneumatic device for drawing the different materials through the respective aperture.

32. A material distribution device according to claim 31, further including a sweeper plate mounted on the plate opposing the base member and surrounding the outlet.

33. A material distribution device according to claim 32, further including a seal member mounted on the base member about the apertures and contacting the plate.

34. A material distribution device according to claim 25, wherein the movable member includes a plate slidably mounted in the frame, and the drive means includes a motor for sliding the plate.

35. A commodity densification and distribution assembly, comprising:

a housing having an insert port for receiving a commodity;

sensor means disposed in the housing for sensing a feature of the commodity, and for determining whether the commodity belongs to a first group of commodities or a second group of commodities according to the sensed feature of the commodity;

densification means disposed in the housing downstream of the sensor means for densifying the commodity into densified material; and densified material distribution means for distributing densified material from the first group of commodities into a first path, and for distributing densified material from the second group of commodities into a second path, the distribution means including:

(a) a plate slidably mounted in the housing beneath the densification means;

(b) a collection member mounted on the plate and having an inlet and an outlet, the collection member collecting the densified material from the densification means at the inlet and distributing the densified material at the outlet;

(c) drive means, responsive to the sensor means, for driving the plate to a first predetermined position to distribute the densified material into the first path, and for driving the plate to a second predetermined position to distribute the densified material into the second path;

(d) a position indicator mounted for movement with the plate; and (e) a plurality of position sensors for sensing the position indicator, each of the position sensors being mounted on the frame so that, when a given position sensor senses the position indicator, the plate is positioned in a corresponding one of the predetermined positions, the drive means driving the plate responsive to the feature sensed by the sensor means and positioning the plate responsive to the sensing of the position indicator by the position sensors.

36. A commodity densification and distribution assembly according to claim 35, wherein the drive means includes a motor for sliding the plate.

37. A commodity densification and distribution assembly according to claim 35, wherein the housing includes a base member on which the plate is mounted, the base member defining a plurality of apertures therethrough, the collection member outlet communicating with a respective aperture when the plate is at a given predetermined position.

38. A commodity densification and distribution assembly according to claim 35, wherein the sensed feature is a material of composition of the commodity.

39. A commodity densification and distribution assembly according to claim 35, wherein the sensed feature is a color of the commodity.

40. A commodity densification and distribution assembly according to claim 35, further including a pneumatic device for drawing the different commodities through the respective aperture.

* * * * *